United States Patent
Yoon et al.

(10) Patent No.: US 12,430,549 B2
(45) Date of Patent: Sep. 30, 2025

(54) FIRST NEURAL NETWORK PROCESSING ITEM USAGE HISTORY DATA AND SECOND NEURAL NETWORK PROCESSING ITEM USAGE AND USER TASTE HISTORY DATA TO DETERMINE USER-PREFERRED ITEM CANDIDATES AND USER TASTE INFORMATION

(71) Applicant: SAMSUNG ELECTRONICS CO., LTD., Suwon-si (KR)

(72) Inventors: Daewon Yoon, Suwon-si (KR); Jinhyun Kim, Suwon-si (KR); Byeol Park, Suwon-si (KR); Sangshin Park, Suwon-si (KR); Changkun Park, Suwon-si (KR); Gohwoon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1103 days.

(21) Appl. No.: 17/119,393

(22) Filed: Dec. 11, 2020

(65) Prior Publication Data
US 2021/0201146 A1     Jul. 1, 2021

(30) Foreign Application Priority Data

Dec. 26, 2019   (KR) .......................... 10-2019-0175498

(51) Int. Cl.
*G06N 3/08*     (2023.01)
*G06F 3/0482*   (2013.01)
*G06N 5/046*    (2023.01)

(52) U.S. Cl.
CPC .............. *G06N 3/08* (2013.01); *G06N 5/046* (2013.01); *G06F 3/0482* (2013.01)

(58) Field of Classification Search
USPC ........................................................ 706/21
See application file for complete search history.

(56) References Cited

U.S. PATENT DOCUMENTS

| 6,092,049 | A | 7/2000 | Chislenko et al. |
| 6,807,574 | B1 | 10/2004 | Partovi et al. |
| 7,480,640 | B1 | 1/2009 | Elad et al. |
| 10,007,732 | B2 * | 6/2018 | Bennett ............ G06F 16/24578 |
| 10,339,538 | B2 | 7/2019 | Souders et al. |
| 11,226,831 | B2 * | 1/2022 | Lee ..................... G06F 3/04847 |
| 2013/0046772 | A1 * | 2/2013 | Gu ........................ G06F 16/435 |
| | | | 707/E17.014 |

(Continued)

FOREIGN PATENT DOCUMENTS

| KR | 10-1054088 | 8/2011 |
| KR | 10-2018-0121466 | 11/2018 |

(Continued)

OTHER PUBLICATIONS

Shalev-Shwartz, Shai, and Ben-David, Shai, Understanding Machine Learning: From Theory to Algorithms, Cambridge University Press, available at https://www.cs.huji.ac.il/~shais/UnderstandingMachineLearning/copy.html (2014).*

(Continued)

*Primary Examiner* — Tadesse Hailu
(74) *Attorney, Agent, or Firm* — NIXON & VANDERHYE P.C.

(57) ABSTRACT

The disclosure relates to an artificial intelligence (AI) system, which imitates functions of the human brain, such as recognition and determination, using a machine learning algorithm such as deep learning, and an application thereof. A computing device includes: a memory storing one or more instructions; and a processor configured to execute the one or more instructions stored in the memory to execute the one or more instructions to: using at least one neural network, infer user-preferred item candidates and user tastes based on user information; and select and provide an item suited to the user tastes from among the user-preferred item candidates.

13 Claims, 14 Drawing Sheets

(56) References Cited

U.S. PATENT DOCUMENTS

| | | | |
|---|---|---|---|
| 2015/0379411 A1* | 12/2015 | Kapoor | G06N 7/01 |
| | | | 706/14 |
| 2017/0061286 A1* | 3/2017 | Kumar | G06Q 30/0269 |
| 2017/0132509 A1 | 5/2017 | Li et al. | |
| 2017/0148084 A1* | 5/2017 | Axelsson | G06F 16/22 |
| 2018/0157499 A1* | 6/2018 | Lee | G06F 9/451 |
| 2018/0276542 A1* | 9/2018 | Cheng | G06F 16/9535 |
| 2019/0253514 A1* | 8/2019 | Yankovich | G06Q 50/04 |
| 2019/0347708 A1 | 11/2019 | Min et al. | |
| 2020/0065772 A1* | 2/2020 | Whitehead | G06N 20/00 |
| 2020/0334055 A1 | 10/2020 | Cho et al. | |
| 2021/0034682 A1* | 2/2021 | Manggala | G06Q 30/0641 |

FOREIGN PATENT DOCUMENTS

| | | |
|---|---|---|
| KR | 10-2019-0103505 | 9/2019 |
| WO | 2017/035519 | 3/2017 |
| WO | 2019/093819 | 5/2019 |

OTHER PUBLICATIONS

International Search Report and Written Opinion issued Mar. 2, 2021 in corresponding International Application No. PCT/KR2020/017501.

European Search Report and Written Opinion dated May 25, 2021 in corresponding European Application No. 20211411.2.

Atote Bhushan S et al: "Personalization in user profiling: Privacy and security issues", 2016 International Conference on Internet of Things and Applications (IOTA), IEEE, Jan. 22, 2016 (Jan. 22, 2016), pp. 415-417, XP032958451, DOI: 10.1109/IOTA.2016. 7562763.

Korean Office Action dated Jul. 10, 2024 for KR Application No. 10-2019-0175498.

European Office Action dated Nov. 21, 2024 for EP Application No. 20211411.2.

* cited by examiner

FIRST NEURAL NETWORK PROCESSING ITEM USAGE HISTORY DATA AND SECOND NEURAL NETWORK PROCESSING ITEM USAGE AND USER TASTE HISTORY DATA TO DETERMINE USER-PREFERRED ITEM CANDIDATES AND USER TASTE INFORMATION

CROSS-REFERENCE TO RELATED APPLICATION

This application is based on and claims priority under 35 U.S.C. § 119 to Korean Patent Application No. 10-2019-0175498, filed on Dec. 26, 2019, in the Korean Intellectual Property Office, the disclosure of which is incorporated by reference herein in its entirety.

BACKGROUND

1. Field

The disclosure relates to a computing device and an operation method thereof, and for example, to a computing device, which provides information about an item suited to tastes of a user using an artificial intelligence model, and an operation method thereof.

2. Description of Related Art

Recommender systems may refer, for example, to systems for predicting user-preferred items or the like. Internet shopping sites such as Amazon or online video content delivery sites such as Netflix obtain ratings given to each item by users, item purchase histories, watch histories, or the like, and based thereon, subsequently predict what items to recommend to the users.

Artificial Intelligence (AI) systems may refer, for example, to systems in which machines, by themselves, derive intended results or perform intended operations by performing training and making determinations.

SUMMARY

Embodiments of the disclosure provide a computing device for inferring tastes of a user and item candidates likely to be preferred by the user, based on limited user information, using an artificial intelligence model, and an operation method of the computing device.

Embodiments of the disclosure provide a computing device for, even regarding different fields with no user history, inferring tastes of a user and item candidates likely to be preferred by the user, using an artificial intelligence model, and an operation method of the computing device.

Embodiments of the disclosure provide a computing device for inferring tastes of a user and item candidates likely to be preferred by the user, selecting an item suited to the tastes of the user therefrom, and providing the selected item to the user, and an operation method of the computing device.

Additional aspects will be set forth in part in the description which follows and, in part, will be apparent from the description.

According to an example embodiment of the disclosure, a computing device includes: a memory storing one or more instructions; and a processor configured to execute the one or more instructions stored in the memory, wherein the processor is configured to execute the one or more instructions to: using at least one neural network, infer user-preferred item candidates based on user information, and infer user tastes based on the user information; and select and provide an item suited to the user tastes from among the user-preferred item candidates.

In an example embodiment of the disclosure, the processor may be further configured to execute the one or more instructions to: impart a different weight to each category; and infer at least one of the user-preferred item candidates or the user preferences by considering the weight for each category.

In an example embodiment of the disclosure, the processor may be further configured to execute the one or more instructions to: using a first neural network, learn, in advance, data of at least one of a relationship between a history and an item, an item usage history of another person, or information about a different item preferred by a user of a certain item; and infer the user-preferred item candidates based on the data obtained from the learning and the user information.

In an example embodiment of the disclosure, the processor may be further configured to execute the one or more instructions to: using a second neural network, learn, in advance, data of at least one of a relationship between a history and an taste, a taste history of another person, or information about a different taste preferred by a user having a certain taste; and infer the user tastes based on data obtained from the learning and the user information.

In an example embodiment of the disclosure, the processor may be further configured to execute the one or more instructions to: select an item suited to the user tastes from among the user-preferred item candidates based on information about a relationship between a taste and an item.

In an example embodiment of the disclosure, the at least one neural network may be configured to learn by receiving feedback on at least one of a result of inferring the user-preferred item candidates or a result of inferring the user tastes.

In an example embodiment of the disclosure, the at least one neural network may be configured to use a collaborative filtering model.

In an example embodiment of the disclosure, each item and taste may possess metadata unique thereto, and the processor may be further configured to execute the one or more instructions to infer the user-preferred item candidates and the user tastes by comparing metadata corresponding to the user information with the metadata of each item and taste.

In an example embodiment of the disclosure, the user information may include one or more of an item usage history of a user, an item preference of the user, profile information of the user, and information about tastes or preferences of the user for various categories.

In an example embodiment of the disclosure, the processor may be further configured to execute the one or more instructions to select the item suited to the user tastes from among different items other than items included in the user information among the user-preferred item candidates.

In an example embodiment of the disclosure, the computing device may further include a communication unit including communication circuitry configured to transmit signals to and receive signals from at least one user equipment, wherein the processor may be further configured to execute the one or more instructions to: receive the user information input from the at least one user equipment via the communication unit; and transmit the item suited to the user tastes from among the user-preferred item candidates to at least one of the at least one user equipment via the communication unit.

In an example embodiment of the disclosure, the computing device may further include: a communication unit including communication circuitry configured to transmit signals to and receive signals from at least one user equipment; a display outputting an image; and a user interface including circuitry configured to receive the user information that is input thereto, wherein the processor may be further configured to execute the one or more instructions to: receive the user information input from at least one of the user interface or the at least one user equipment; select the item suited to the user tastes from among the user-preferred item candidates based on the user information; and output the selected item via the display.

According to another example embodiment of the disclosure, an image display device includes: a computing device comprising circuitry and a communication unit including communication circuitry; a display configured to display an image; a user interface including circuitry configured to receive user information input thereto; a memory storing one or more instructions; and a processor configured to execute the one or more instructions stored in the memory, wherein the processor is configured to execute the one or more instructions to: transmit the user information, input via the user interface to the computing device via the communication unit; receive information about an item suited to user tastes via the communication unit, the user tastes being obtained by the computing device based on the user information using at least one neural network; and output the information about the item suited to the user tastes via the display.

According to an example embodiment of the disclosure, a method of operating a computing device includes: obtaining user information; inferring user-preferred item candidates using a first neural network based on the user information; inferring user tastes using a second neural network based on the user information; and providing an item suited to the user tastes from among the user-preferred item candidates.

According to an example embodiment of the disclosure, a non-transitory computer-readable recording medium having recorded thereon a program for implementing, when executed, an operation method of a computer device, the operation method including: obtaining user information; inferring user-preferred item candidates using a first neural network based on the user information; inferring user tastes using a second neural network based on the user information; and providing an item suited to the user tastes from among the user-preferred item candidates.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
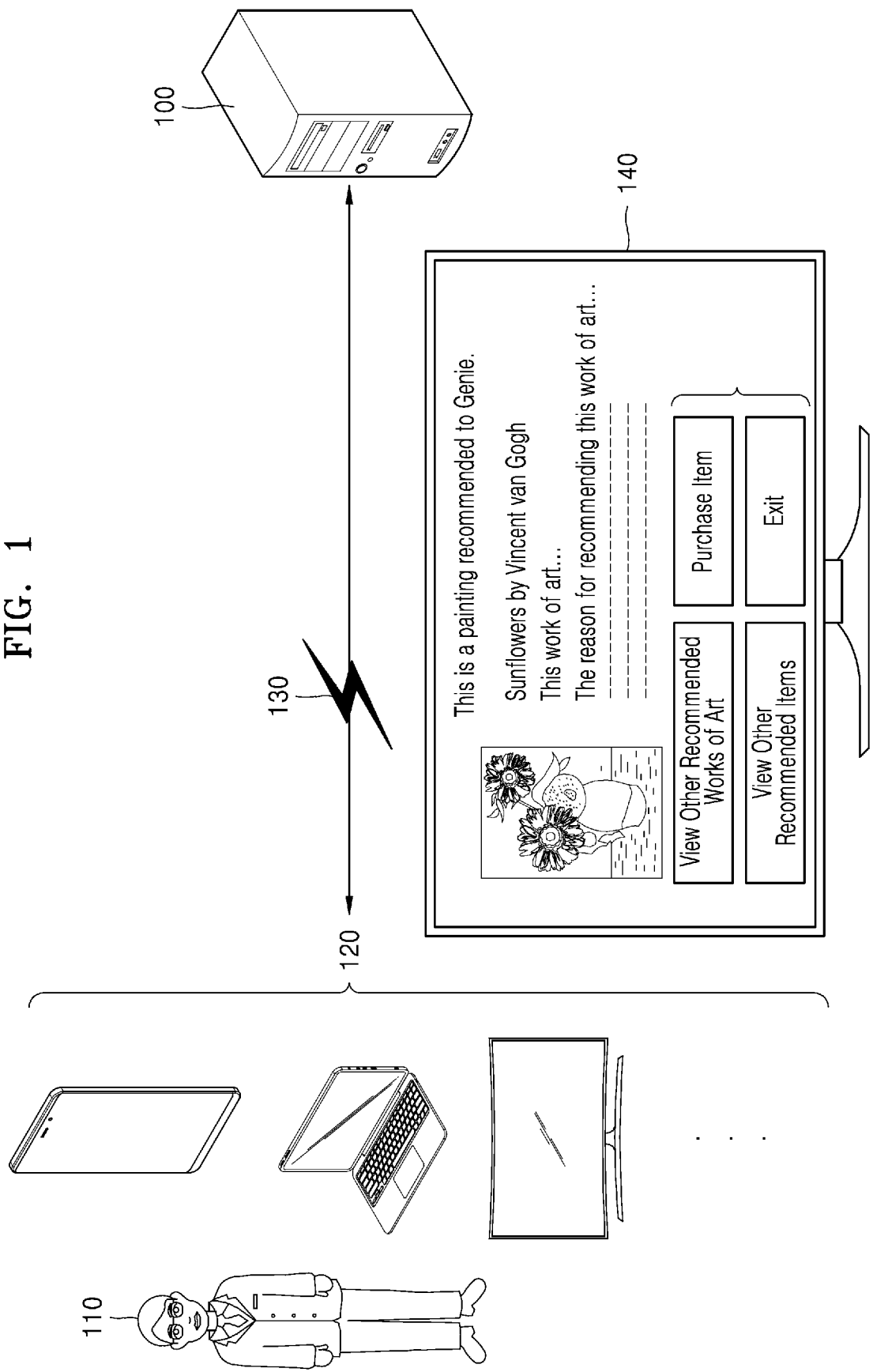
FIG. 1 is a diagram illustrating an example computing device providing an item suited to user tastes, according various embodiments.

Hereinafter, various example embodiments of the disclosure will be described in greater detail with reference to the accompanying drawings. However, it should be understood that the disclosure is not limited to the various example embodiments described herein and may be embodied in different ways.

Although terms used herein are of among general terms which are currently and broadly used by considering functions in the disclosure, these terms may vary according to intentions of those of ordinary skill in the art, precedents, the emergence of new technologies, or the like. Therefore, the terms used herein should be defined based on the meaning thereof and descriptions made throughout the disclosure, rather than based simply on names used.

In addition, the terms used herein are merely for describing example embodiments of the disclosure and are not intended to limit the disclosure.

Throughout the disclosure, when an element is referred to as being "connected to" another element, the element can be "directly connected to" the other element or can be "electrically connected to" the other element with an intervening element therebetween.

Throughout the disclosure, the expression "at least one of a, b or c" indicates only a, only b, only c, both a and b, both a and c, both b and c, all of a, b, and c, or variations thereof.

As used herein, for example, in the appended claims, the directive terms such as "the," "said" and "aforementioned" may indicate both the singular forms and the plural forms. In addition, unless the context clearly indicates the order of operations of a method according to the disclosure, the operations may be performed in a suitable order. The disclosure is not limited to the described order of the operations.

A phrase such as "in some embodiments" or "in an embodiment (or in one embodiment)", which appears in various places herein, does not always indicate the same embodiment.

Some embodiments of the disclosure may be represented by functional block components and various processing operations. Some or all of such functional blocks may be implemented by various numbers of hardware and/or software components for performing particular functions. For example, the functional blocks of the disclosure may be implemented by one or more microprocessors or may be implemented by circuit components for certain functions. In addition, for example, the functional blocks of the disclosure may be implemented by various programming or scripting languages. The functional blocks may be implemented by algorithms executed by one or more processors. In addition, the disclosure may employ techniques according to the related art, for electronic environment settings, signal processing, data processing, and/or the like. Terms such as "mechanism", "element", "means" and "component" may be broadly used and are not limited to mechanical and physical components.

In addition, connection lines or connection members between components illustrated in the drawings merely represent examples of functional connections and/or physical or circuit connections. In actual devices, connections between components may be represented by various functional, physical, or circuit connections, which may be substituted or added.

In addition, the term such as " . . . unit", " . . . portion", " . . . module", or the like used herein refers to a unit for processing at least one function or operation, and this may be implemented by hardware, software, or a combination of hardware and software.

Further, the term "user" used herein refers to a person, which controls functions or operations of a computing device or an image display device using the computing device or the image display device, or which makes use of an image display device according to functions thereof, and may include a viewer, a manager, or an installation engineer.

Hereinafter, various example embodiments of the disclosure will be described in greater detail with reference to the accompanying drawings.

FIG. 1 is a diagram illustrating an example computing device 100 providing an item suited to user tastes, according to various embodiments.

Referring to FIG. 1, the computing device 100 is coupled to various user equipments 120 via a communication network 130.

A user 110 may use the user equipments 120. The user equipments 120 may be implemented by various types of electronic devices capable of communicating with the computing device 100 in a wired or wireless manner.

The user 110 may make a function of each electronic device be performed using the user equipments 120 in various manners. For example, using the user equipments 120, the user 110 may reserve a movie ticket over the Internet, may search for a particular item, or may purchase a particular item.

In an embodiment of the disclosure, a history of use of the user equipments 120 by the user 110 may be transmitted to the computing device 100 via the communication network 130. In an embodiment of the disclosure, the computing device 100 may collect information such as profile information of the user 110, an item usage history of the user 110, or preferences of the user 110. Hereinafter, the profile information of the user 110, the history of use of the user equipments 120 by the user 110, the preferences of the user 110, and the like, which are collected by the computing device 100, may be referred to as user information.

In an embodiment of the disclosure, the computing device 100 may be trained, in advance, based on information about tastes, consumption items, or the like of a large number of people using a neural network. Based on the user information, the computing device 100 may infer tastes of the user 110 using data learned by the neural network. In addition, based on the user information, the computing device 100 may infer a plurality of user-preferred item candidates using the data learned by the neural network. The user-preferred item candidates may denote items likely to be preferred by the user 110, for one category or for a respective plurality of categories.

The computing device 100 may select an item suited to the user tastes using both the user tastes and the user-preferred item candidates.

The computing device 100 may transmit the selected item to the user equipments 120 via the communication network 130. At least one of the user equipments 120 may output the item suited to the user tastes onto a screen 140, the item being received from the computing device 100.

By the above-described method, the computing device 100 may infer the user tastes and user-preferred items based on the user information, may select the item suited to the user tastes based thereon, and may recommend the selected item to the user 110. Accordingly, the user 110 may receive a recommendation of an item personalized and customized for the user 110, from among a large number of items.

Figure 2:
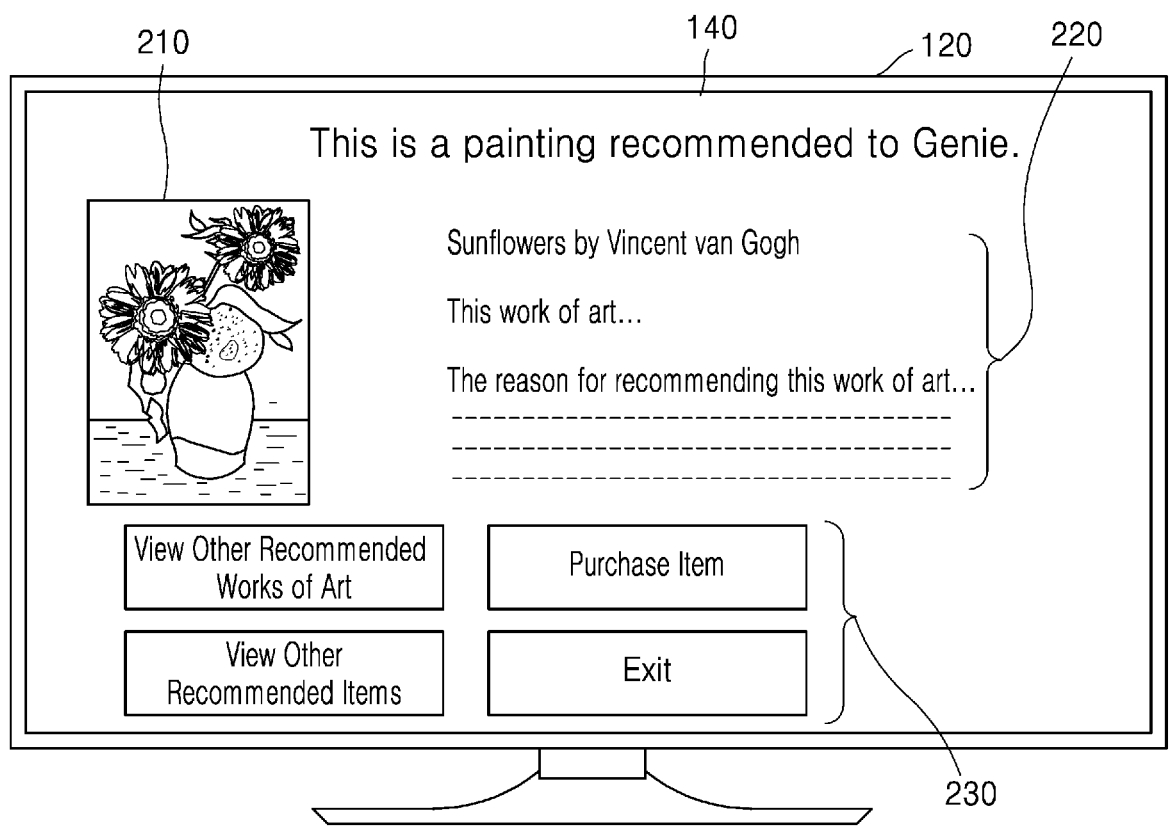
FIG. 2 is a diagram illustrating an example screen that outputs an item suited to user tastes that are generated by the computing device of FIG. 1, according to various embodiments.

FIG. 2 is a diagram illustrating an example screen that outputs an item suited to user tastes, which are generated by the computing device 100 of FIG. 1, according to various embodiments.

Referring to FIG. 2, the user equipments 120 may receive the item suited to the user tastes from the computing device 100 via the communication network 130. The item suited to the user tastes may vary according to each category. In an embodiment of the disclosure, the computing device 100 may infer user-preferred item candidates on a category basis, regarding various categories.

FIG. 2 illustrates an embodiment in which, from among a plurality of items, a famous painting is recommended to the user 110. In an embodiment of the disclosure, the computing device 100 may infer a famous painting, which is likely to be liked by the user 110, from among a plurality of famous paintings. Based on user information, the computing device 100 may infer famous painting candidates likely to be liked by the user 110, using training data obtained from a pre-learning operation. In addition, based on the user information, the computing device 100 may infer user tastes using the pre-learned data. The computing device 100 may select a famous painting suited to the user tastes from among a plurality of famous painting candidates by considering the user tastes. After selecting the famous painting suited to the user tastes, the computing device 100 may transmit the selected famous painting to the user equipments 120.

In FIG. 2, the user equipments 120 may output the item suited to the user tastes and received from the computing device 100 onto the screen 140. The famous painting suited to the user tastes may be displayed on the screen 140. For example, the screen 140 of FIG. 2 illustrates that a work of art "Sunflowers" by "Vincent van Gogh" is recommended as the famous painting likely to be liked by the user 110.

The screen 140 may include a recommended work of art 210 and an artwork description 220 thereof. The artwork description 220 may include basic descriptions of a work of art, such as the type or painting style of the work of art, and the meaning of sunflowers corresponding to a subject, in addition to basic information such as a painter of the work of art, the title of the work of art, and the year in which the work of art was created. In addition, the artwork description 220 may also include a reason for recommending the work of art to the user 110. For example, when the user 110 likes "The Starry Night", which is another work of art by "Vincent van Gogh", and also likes flowers as subjects of famous paintings, the computing device 100 may recommend, based on such user information, a work of art having a subject likely to be liked by the user 110 from among other works of art of the painter liked by the user 110 by considering the user tastes. In this case, the artwork description 220 may include a point that the user 110 likes "Vincent van Gogh", the point that the user 110 likes famous paintings having subjects of flowers, and a description indicating that, for these reasons, the corresponding work of art is recommended to the user 110.

In an embodiment of the disclosure, the screen 140 may include various interfaces 230 that may be selected by the user 110. For example, when there are additional works of art recommended to the user 110, the user 110 may view other famous paintings by selecting "View Other Recommended Works of Art". Alternatively, when the user 110 wants to receive recommendations of other items instead of famous paintings, the user 110 may select a button of "View Other Recommended Items". When the user 110 wants to purchase the recommended work or art 210, the user 110 may purchase the recommended work or art 210 by selecting "Purchase Item". In addition, when the user 110 wants to quit viewing the screen 140, the user 110 may cause the screen 140 to be terminated by selecting "Exit".

As such, the user 110 may receive a recommendation of an item in consideration of the user tastes via the screen 140 of the user equipments 120. Because the user 110 may receive a recommendation of a customized item and also check even a description indicating why the corresponding item has been recommended, the user 110 may have higher trust in the computing device 100 recommending the work of art.

Figure 3:
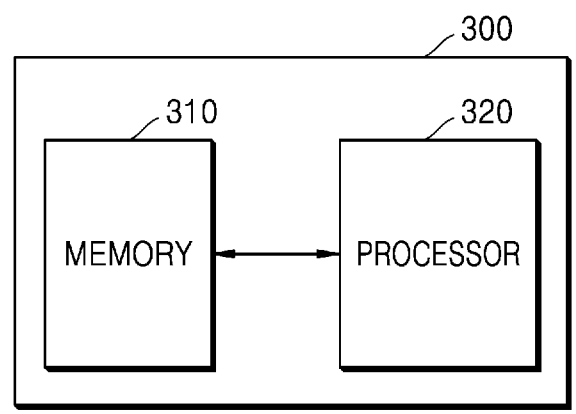
FIG. 3 is a block diagram illustrating an example configuration of a computing device according to various embodiments.

FIG. 3 is a block diagram illustrating an example configuration of a computing device 300 according to various embodiments. Referring to FIG. 3, the computing device 300 may include a memory 310 and a processor (e.g., including processing circuitry) 320.

In an embodiment of the disclosure, the computing device 300 may be implemented by various electronic devices capable of collecting user information, inferring user-preferred items suited to user tastes based thereon, and then providing a result thereof. In an embodiment of the disclosure, the computing device 300 may be manufactured in the form of at least one hardware chip and mounted in an electronic device, or may be included in the form of a chip or an electronic device in a server. The computing device 300 may also be included in an image display device (not shown) or the like. The computing device 300 may also be implemented by a software module.

The memory 310 according to an embodiment of the disclosure may store at least one instruction. The memory 310 may store at least one program executed by the processor 320. In addition, the memory 310 may store data that is input to or output from the computing device 300.

In an embodiment of the disclosure, the memory 310 may store the user information that is input thereto. The memory 310 may store, in the form of a table or the like, metadata corresponding to the user information. In addition, the memory 310 may store at least one artificial intelligence (AI) model described below. In an embodiment of the disclosure, the memory 310 may store at least one of a first neural network model or a second neural network model. When the first neural network model includes a plurality of AI models, the memory 310 may store the plurality of AI models. In addition, when the second neural network model includes a plurality of AI models, the memory 310 may store the plurality of AI models.

The memory 310 may include at least one of a flash memory type storage medium, a hard disk type storage medium, a multimedia card micro type storage medium, card type memory (for example, Secure Digital (SD) memory, eXtreme Digital (XD) memory, or the like), random access memory (RAM), static random access memory (SRAM), read-only memory (ROM), electrically erasable programmable read-only memory (EEPROM), programmable read-only memory (PROM), magnetic memory, a magnetic disk, or an optical disk.

The processor 320 may include various processing circuitry and controls overall operations of the computing device 300. The processor 320 may execute the at least one instruction stored in the memory 310 to control the computing device 300 to function.

In an embodiment of the disclosure, the processor 320 may execute the at least one instruction to infer user-preferred item candidates based on the user information, using at least one neural network. In an embodiment of the disclosure, the processor 320 may execute the at least one instruction to infer user tastes based on the user information, using the at least one neural network. In an embodiment of the disclosure, the processor 320 may execute the at least one instruction to select an item suited to the user tastes from among the user-preferred item candidates.

In an embodiment of the disclosure, the computing device 300 may use AI technology. The AI technology may include, for example, machine learning (deep learning) and element technologies using machine learning. The AI technology may be implemented using algorithms. An algorithm or a set of algorithms for implementing the AI technology may, for example, be referred to as a neural network. The neural network may receive input data, perform computations for analysis and classification, and thus, output result data. As such, for the neural network to accurately output the result data corresponding to the input data, the neural network needs to be trained. The term "training" may refer, for example, to inputting various pieces of data to the neural network and training the neural network to allow the neural network to find or learn, by itself, a method of analyzing the input pieces of data, a method of classifying the input pieces of data, a method of extracting, from the input pieces of data, features required to produce the result data, and/or the like. The training of the neural network may denote that an AI model having intended characteristics is made by applying a learning algorithm to a large number of pieces of training data. Such training may be performed by the computing device 300 itself, in which AI is performed in an embodiment of the disclosure, or may be performed through a separate server/system.

The learning algorithm may refer, for example, to a method of allowing a certain object device (for example, a robot) to make a determination or make a prediction by itself by training the certain object device using a large number of pieces of training data. Examples of the learning algorithm include supervised learning, unsupervised learning, semi-supervised learning, and reinforcement learning, and the learning algorithm in an embodiment of the disclosure is not limited to the examples set forth above unless the context clearly indicates otherwise.

A set of algorithms, which causes output data corresponding to input data to be output via the neural network, software for executing the set of algorithms, and/or hardware for executing the set of algorithms may be referred to as "AI model".

The processor 320 may process the input data, according to a predefined operation rule or an AI model, which is stored in the memory 310. The predefined operation rule or the AI model may be made using a particular algorithm. In addition, the AI model may be an AI model obtained by training a particular algorithm.

The processor 320 may generate the output data corresponding to the input data through the AI model. In an embodiment of the disclosure, the processor 320 may generate final output data from the input data using a plurality of AI models.

In an embodiment of the disclosure, the computing device 300 may collect the user information. When the computing device 300 is included in a server, the computing device 300 may collect user information of a user using a plurality of user equipments from at least one of the plurality of user equipments by communicating with the plurality of user equipments via a communication network. When the computing device 300 is included in an image display device, the computing device 300 may collect the user information based on a history of use of the image display device by the user. In this case, the computing device 300 may receive histories, in which the user has used other user equipments connected to the image display device via the communication network, and may also use these histories as the user information. In an embodiment of the disclosure, the user information may include at least one of a history in which the user has used or consumed a particular item, a preference of the user for a particular field, or profile information of the user.

The processor 320 may infer user-preferred item candidates based on the user information, using the first neural network model. The first neural network model may include an algorithm or a set of algorithms for predicting, from pre-learned data, future preferences based on similarity patterns, software for executing the set of algorithms, and/or hardware for executing the set of algorithms.

In an embodiment of the disclosure, the first neural network model may learn a relationship between the user information and items. The first neural network model may analyze and learn information about behavior, activities, or preferences of a lot of users. Based on training data obtained from a pre-learning operation collected from a plurality of users, the first neural network model may determine similarities between a current user and other users using user information of the current user and may predict an item likely to be preferred by the current user according thereto. The first neural network model may learn item-related information of the plurality of users again on a regular cycle and thus update the learned data.

After inferring the item likely to be preferred by the current user, the first neural network model may learn a result thereof by receiving feedback on the result.

In an embodiment of the disclosure, the first neural network model may impart unique metadata to each item and make use thereof. When the user information is input to the first neural network model, the first neural network model may find metadata corresponding to the user information and map the metadata to the user information, and then, the first neural network model may compare the metadata corresponding to the user information with the metadata of each item and thus determine similarity therebetween. Based on the similarity between each metadata, the first neural network model may compare item-related behavior patterns or preferences between a particular user and other users.

In an embodiment of the disclosure, the first neural network model may use collaborative filtering. Methods of collaborative filtering may include, but are not limited to, a memory-based method, a model-based method, a hybrid method using both, or the like.

In an embodiment of the disclosure, the first neural network model may infer a different item instead of an item that already has been used by the user, based on past history information of the user.

In an embodiment of the disclosure, the processor 320 may infer user tastes based on the user information, using the second neural network model. The second neural network model may learn various pieces of information related to tastes. The second neural network model may include an algorithm or a set of algorithms for predicting, based on learned data, tastes of the current user using the similarity patterns, software for executing the set of algorithms, and/or hardware for executing the set of algorithms.

Using the second neural network model, the processor 320 may determine similarities between the current user and other users from the user information of the current user, based on the learned data, and may predict the tastes of the current user according thereto.

After inferring subject-specific tastes of the current user, the second neural network model may learn a result thereof by receiving feedback on the result. The second neural network model may learn taste-related information of the plurality of users again on a regular cycle and thus update and use the learned data.

In an embodiment of the disclosure, the second neural network model may also use, but is not limited to, collaborative filtering.

In an embodiment of the disclosure, the first neural network model and the second neural network model may impart unique metadata to each item or taste and use the unique metadata. When the user information is input, each of the first neural network model and the second neural network model may perform mapping between the metadata corresponding to the user information and the user information, and then, may determine similarity between the metadata corresponding to the user information and the metadata of each item or taste by performing a comparison therebetween. Each of the first neural network model and the second neural network model may compare item-related or taste-related behavior patterns or preferences between a particular user and other users, based on the similarity between each metadata.

In an embodiment of the disclosure, at least one of the first neural network model or the second neural network model may impart a different weight to each category and may infer the user-preferred item candidates or the user tastes by considering the weight for each category.

For example, it is assumed that a particular user likes a particular painter "Vincent van Gogh" and also likes lotus flowers in terms of subjects of famous paintings. Here, a degree at which the user likes "Vincent van Gogh" may be much higher than a degree at which the user likes lotus flowers in terms of subjects of famous paintings. It is assumed that, because the user likes "Vincent van Gogh" at an extremely high degree, the user has a history of having spent a lot of time and money in relation to "Vincent van Gogh", such as having spent a lot of time on appreciating works of art by "Vincent van Gogh" and having purchased movies or books related to "Vincent van Gogh", and it is also assumed that, although the user likes various subjects as subjects of famous paintings and likes lotus flowers and roses thereamong at a similar degree, the user likes lotus flowers slightly more than roses. In this case, the second neural network model may respectively impart different weights to the degree at which the user likes "Vincent van Gogh" and the degree at which the user likes lotus flowers as subjects of famous paintings, thereby inferring the tastes of the user. For example, in this case, the second neural network model may make a recommendation resulting in placing a higher priority on the work of art "Iris" by "Vincent van Gogh" than the work of art "Waterlilies" by "Monet".

In an embodiment of the disclosure, after the processor 320 infers the user-preferred item candidates and the user tastes, respectively, the processor 320 may select an item suited to the user tastes by considering both thereof. The processor 320 may select an item reflecting the tastes of the user from among various item candidates, based on information about a relationship between a particular item and a particular taste. For example, in the above example, the processor 320 may infer "Iris" and "Sunflowers" by "Vincent van Gogh" as the user-preferred item candidates. In addition, the processor 320 may infer the tastes of the user from the fact that the user appreciates a lot of works of art having yellow colors. In this case, the processor 320 may select "Sunflowers" having a higher proportion of yellow colors than "Iris" from the two works or art, that is, "Iris" and "Sunflowers", and provide "Sunflowers". The processor 320 may output the item resulting from consideration of the tastes of the user.

Figure 4:
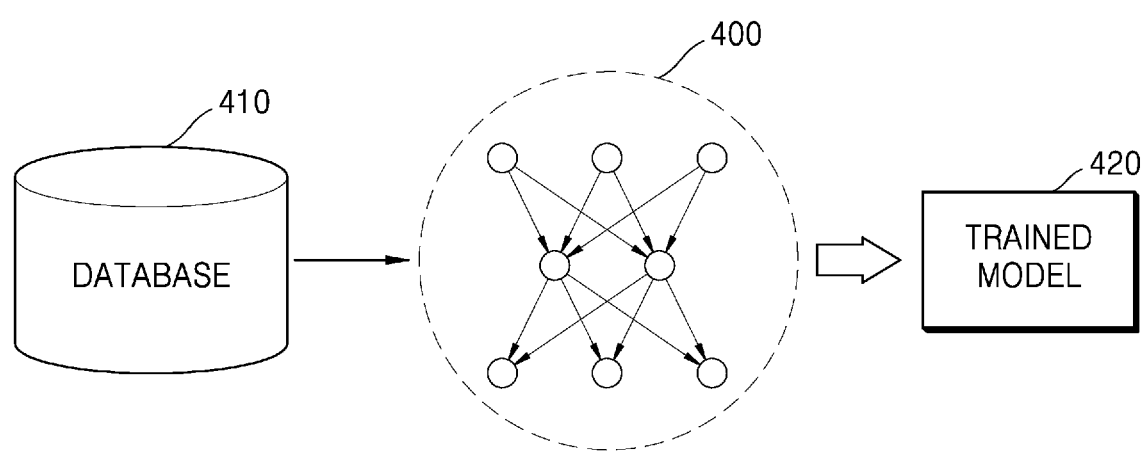
FIG. 4 is a diagram illustrating an example neural network learning a method of inferring items and tastes, according to various embodiments.

FIG. 4 is a diagram illustrating an example neural network learning a method of inferring items and tastes, according to various embodiments.

Referring to FIG. 4, a neural network 400 may learn a method of inferring items by receiving a plurality of pieces of training data as input values from a database 410. For example, the neural network 400 may receive, as input, information about a relationship between user information and items from the database 410 and learn the information.

In an embodiment of the disclosure, the user information may include information about behavior or preferences with respect to a particular item, such as a history of using or viewing the particular item, a history of searching for the particular item, and a history of purchasing the particular item. In addition, the user information may include information about subject-specific preferences of each user with respect to various subjects, such as a preference for a particular brand, information about a preferred painter or a preferred style of painting, and information about a preferred actor or director. Further, the user information may include various pieces of personal profile information, such as jobs, ages, gender, marital status, the number of children, the number of family members, places of residence, the number of travels, annual incomes, and consumption levels of users.

The neural network 400 may analyze and learn information about behavior, activities, or preferences of a lot of users. The neural network 400 may learn various pieces of information related to items, including information about items purchased or searched for by many users, information about content read or viewed by many users, information about an item preferred by a person having a certain taste, such as information indicating that a user listening to a particular piece of music at particular time likes a particular item of a particular brand, and information about which automobile is preferred by people living in a particular region, information about another different item consumed by a user consuming a particular item, and the like.

In an embodiment of the disclosure, the neural network 400 may learn a method of inferring tastes by receiving a plurality of pieces of training data as input values from the database 410. In an embodiment of the disclosure, the neural network 400 may receive, as input, information about a relationship between the user information and tastes from the database 410 and learn the information. For example, the neural network 400 may learn the information about the relationship between the user information and tastes, such as information about what color is liked by people preferring a particular painter, or information about what style of painting is preferred by people living in a particular region and having ages in a particular range. In addition, the neural network 400 may learn, in advance, what tastes people prefer, for respective subjects. Further, the neural network 400 may learn, in advance, what tastes in different fields people having particular tastes prefer, such as what music people liking a particular painter likes.

One or more neural networks 400 may learn a method of inferring user-preferred items and/or user tastes from a plurality of pieces of training data in response to input of the plurality of pieces of training data and may generate a trained model 420 based on a learned result.

The trained model 420 may, for example, be a trained neural network itself, which allows an intended result to be obtained through the neural network. For example, a neural network may be trained using a plurality of pieces of training data, thereby setting a plurality of weight values respectively applied to a plurality of nodes that form the neural network. Here, a weight value may refer to connection strength between the respective nodes of the neural network. The weight value may be optimized through repeated training and may be repeatedly modified until an accuracy of a result satisfies a certain degree of reliability. The trained model 420 may be a neural network formed by weight values that are finally set up.

According to various embodiments of the disclosure, an operation of training the one or more neural networks 400 regarding a method of inferring at least one of the user tastes or the user-preferred items may be performed in advance. In addition, as some of the plurality of pieces of training data are changed, the trained model 420 may be updated. For example, as the user purchases a certain famous painting using a user equipment, information about the famous painting purchased by the user may be fed back to the neural network 400 and used as training data. In addition, on a certain cycle, information about an item used by a plurality of users may be additionally input as the training data. When the new training data is added, the one or more neural networks 400 may learn again the method of inferring at least one of the user tastes and the user-preferred items from the training data, and thus, the trained model may be updated.

In addition, the method of inferring at least one of the user tastes and the user-preferred items from the training data using the one or more neural networks 400 may be performed by a server or may be performed by an image display device (not shown) according to embodiments of the disclosure. For example, an operation of learning the method of inferring at least one of the user tastes or the user-preferred items using the one or more neural networks 400 may require relatively complicated computations. Accordingly, the server may perform the operation of learning and the image display device may receive the trained model 420 from the server external thereto, thereby reducing computations needed to be performed by the image display device. The image display device may receive the trained model 420 from the external server in advance, may store the trained model 420 in a memory, and may infer at least one of the user tastes or the user-preferred items using the stored trained model 420.

Figure 5:
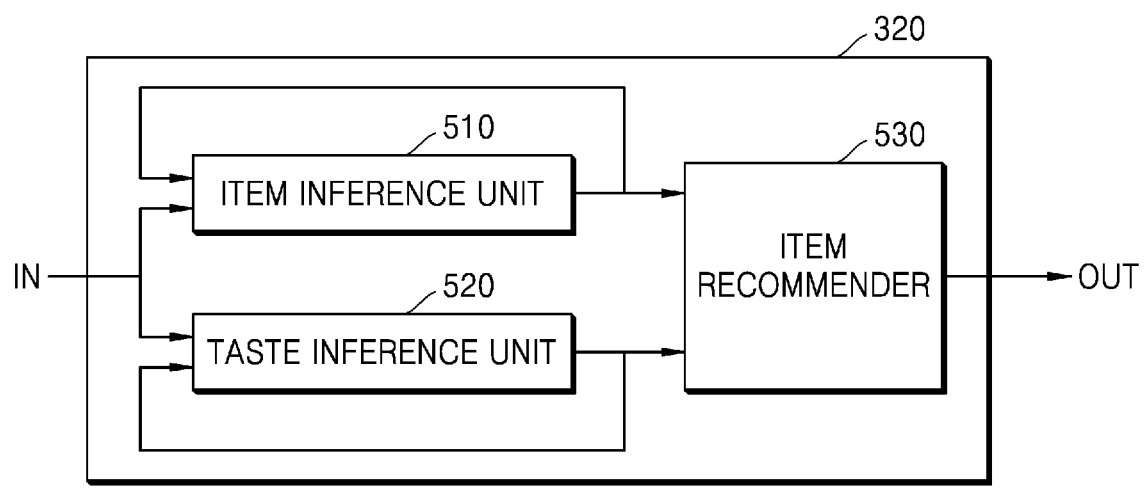
FIG. 5 is a block diagram illustrating an example configuration of a processor included in the computing device, according to various embodiments.

FIG. 5 is a block diagram illustrating an example configuration of the processor 320 included in the computing device 300, according to various embodiments. Referring to FIG. 5, the processor 320 may include an item inference unit (e.g., including processing circuitry and/or executable program elements) 510, a taste inference unit (e.g., including processing circuitry and/or executable program elements) 520, and an item recommender (e.g., including processing circuitry and/or executable program elements) 530.

The processor 320 may receive user history information as input data IN from at least one user equipment 120. The user history information may include one or more of a user identification identifier (ID), identification information of an item used by a user, a method by which the user has used the item, start time of use of the item, and end time of use of the item.

In an embodiment of the disclosure, the processor 320 may determine that, among pieces of history information received from the user, a history of use of the item is valid, only when the user has used the item for certain time or more and/or a certain number of times or more, and may recognize the history of use of the item as the valid user information. For example, when the user has appreciated or searched for the work of art "Sunflowers" by "Vincent van Gogh" for certain time or more or a certain number of times or more using the user equipment, the processor 320 may recognize the corresponding painting as a painting preferred by the user and may use, as a piece of user information, the fact that the user prefers the painting "Sunflowers" by "Vincent van Gogh".

When the user information is valid, the processor 320 may retrieve metadata corresponding to the user information from a table pre-stored in the memory 310. In an embodiment of the disclosure, the table mapping the user information to the metadata may be stored in the memory 310. The processor 320 may retrieve the metadata corresponding to the user information and may store the metadata together with the user information. For example, in the above example, the metadata corresponding to the user information, which is generated by use of the work of art "Sunflowers" by the user, may be information about several elements describing the work of art "Sunflowers". That is, the metadata for the work of art "Sunflowers" may include pieces of information respectively indicating that the subject is flowers, that the color is yellow, that the type of painting is oil painting, and that the painter is "Vincent van Gogh".

In an embodiment of the disclosure, the item inference unit 510 may include various processing circuitry and/or executable program elements and learn, in advance, a method of inferring items by taking a plurality of pieces of training data as input values. For example, using the first neural network model, the item inference unit 510 may learn, in advance, at least one of a relationship between a history and an item, an item usage history of another person, or information about a different item preferred by a user that uses a certain item.

In an embodiment of the disclosure, the item inference unit 510 may learn the plurality of pieces of training data by classifying the plurality of pieces of training data according to metadata. That is, the item inference unit 510 may recognize each item by unique metadata imparted to each of the plurality of items.

The item inference unit 510 may infer user-preferred item candidates based on pre-learned data and metadata according to the user information. The item inference unit 510 may infer, as user-preferred items, items having similarity at a certain reference value or more with respect to the metadata corresponding to the user information. For example, the item inference unit 510 may infer a work of art "Cafe Terrace, Place du Forum, Arles" by "Vincent van Gogh" as a user-preferred item candidate from among famous paintings.

In an embodiment of the disclosure, the item inference unit 510 may infer, as the user-preferred items, a plurality of items belonging to the same category. For example, the item inference unit 510 may infer, as the user-preferred items, a work of art "Bouquet of Sunflowers", which is another famous painting, by "Monet", together with the aforementioned "Cafe Terrace, Place du Forum, Arles".

In an embodiment of the disclosure, the item inference unit 510 may also infer items in different fields rather than famous paintings. From what field the item inference unit 510 will infer items as the user-preferred items for the user may be set up based on various criteria. In an embodiment of the disclosure, the item inference unit 510 may receive an item field selected to be used for inferences from the user that uses the computing device 300 and may infer only items belonging to the field that is set up according thereto. In another embodiment of the disclosure, the item inference unit 510 may determine, by itself, item fields to be used for inferences and may infer items likely to be preferred by the user across several fields. For example, in the above example, the item inference unit 510 may infer, as the user-preferred item, "The Moon and Sixpence" which is a novel about "Gauguin" related to "Vincent van Gogh". In addition, in the above example, the item inference unit 510 may infer, as the user-preferred item for the user, a yellow curtain with flowers painted thereon.

In an example of the disclosure, when the item inference unit 510 infers items in several categories, the item inference unit 510 may impart a different weight to each category and may infer the user-preferred item candidates by considering the weight for each category. For example, the item inference unit 510 may impart higher weights to books and curtains than to famous paintings. In this case, there may be a higher probability that, in the above example, the item inference unit 510 will infer, as the user-preferred items, the novel "The Moon and Sixpence", which is an item belonging to books, and the yellow curtain with flowers painted thereon.

To what item a higher weight will be imparted may be set up according to various criteria. For example, when the item inference unit 510 determines, based on the user information, that the user will prefer a particular category rather than other categories, the item inference unit 510 may impart a higher weight to the particular category according to a result thereof. When the user using the computing device 300 requests the computing device 300 to make inferences about a particular category, the item inference unit 510 may impart a higher weight to the category requested by the user.

After inferring the user-preferred items, the item inference unit 510 may receive, as input, a result value thereof that is fed back to the item inference unit 510. The item inference unit 510 may learn, again, data that is input thereto.

The taste inference unit 520 may include various processing circuitry and/or executable program elements and learn, in advance, a method of inferring user tastes by taking a plurality of pieces of training data as input values. Using the second neural network model, the taste inference unit 520 may learn, in advance, at least one of a relationship between a user history and tastes, a taste history of another person, or a different taste preferred by a user having a certain taste. In an embodiment of the disclosure, the taste inference unit 520 may learn the plurality of pieces of training data by classifying the plurality of pieces of training data according to metadata, thereby recognizing each taste by metadata unique thereto.

The taste inference unit 520 may infer the user tastes based on pre-learned data and metadata according to the user information. The taste inference unit 520 may infer, as the user tastes, tastes having similarity at a certain reference value or more with respect to the metadata corresponding to the user information. For example, in the above example, the taste inference unit 520 may infer that the user will like another impressionist painter, based on the user information and the learned data. In addition, the taste inference unit 520 may infer that the user prefers digital works of art, based on the learned data indicating that people liking the work of art "Sunflowers" have a great preference for digital art.

In an embodiment of the disclosure, when the taste inference unit 520 infers tastes in several categories, the taste inference unit 520 may impart a different weight to each category and may infer the user tastes by considering the weight for each category. For example, in the above example, the taste inference unit 520 may determine that the user has a greater taste for impressionist paintings than for digital art, based on the user information. In this case, the taste inference unit 520 may infer the user tastes by imparting a higher weight to the taste for impressionism than to the taste for digital art.

In what category a higher weight will be imparted to a taste may be set up according to various criteria. For example, the taste inference unit 520 may determine, based on the user information, that the user will prefer a particular category rather than other categories, and may impart a higher weight to the particular category according to a result thereof. When the user using the computing device 300 requests the computing device 300 to make inferences about tastes in a particular category, the taste inference unit 520 may infer tastes by imparting a higher weight to the category requested by the user.

After inferring the user tastes, the taste inference unit 520 may receive, as input, a result value thereof that is fed back to the item inference unit 510 and may learn, again, data that is input thereto.

The item recommender 530 may include various processing circuitry and/or executable program elements and select an item suited to the user tastes, based on the user-preferred items and the user tastes, which are respectively inferred by the item inference unit 510 and the taste inference unit 520. The item recommender 530 may have information about a relationship between a taste and an item, in advance. The item recommender 530 may select an item more suitable to the user tastes from among the user-preferred items, using information about the relationship between a taste and an item. For example, in the above example, the item recommender 530 may finally determine "The Moon and Sixpence" that is a novel regarding Gauguin who is an impressionist painter, as the item suited to the user tastes, from between the novel "The Moon and Sixpence" and the yellow curtain with flowers painted thereon, which are inferred by the item inference unit 510, based on the taste indicating that the user likes impressionist paintings, and may output "The Moon and Sixpence" as output data OUT.

The processor 320 may transmit the output data to a first user equipment 120 or a second user equipment 120. In an embodiment of the disclosure, when the processor 320 is included in an image display device, the processor 320 may cause the output data to be output to the image display device.

As such, because the processor 320 infers items and tastes using the item inference unit 510 and the taste inference unit 520, respectively, and produces a result by performing mapping therebetween, the processor 320 may infer information suitable to the user in a more accurate and detailed manner.

Figure 6:
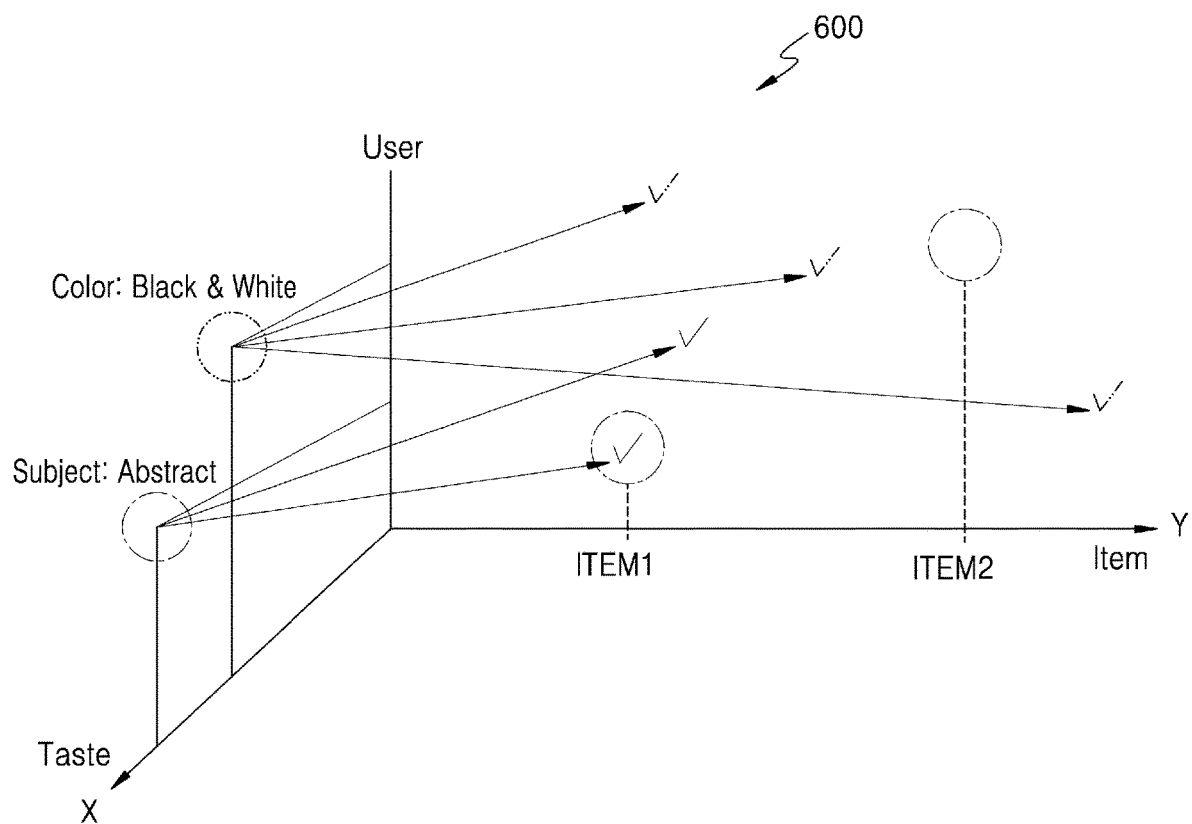
FIG. 6 is a diagram illustrating an example of the computing device selecting user-preferred items by considering user tastes, according to various embodiments.

FIG. 6 is a diagram illustrating an example of the computing device 300 selecting a user-preferred item by considering user tastes, according to various embodiments.

A graph 600 of FIG. 6 is a 3-dimensional graph having an X-axis, a Y-axis, and a Z-axis. In the graph 600, the X-axis represents tastes, the Y-axis represents items, and the Z-axis represents users.

The computing device 300 may infer user tastes, based on data, which is pre-learned using a first neural network, and user information. For example, it is assumed that the computing device 300 has inferred that a user 1 likes abstract paintings. In addition, it is assumed that the computing device 300 has inferred that another user 2 likes black and white. In the graph 600 of FIG. 6, the X-axis and the Z-axis, in combination, indicate a taste of each of the user 1 and the user 2, the taste having been inferred by the computing device 300.

The computing device 300 may infer user-preferred item candidates according to the user information, based on data pre-learned using a second neural network. In FIG. 6, it is assumed that the computing device 300 has inferred an item 1 and an item 2 as user-preferred items for the user 1. In the graph 600 of FIG. 6, the Y-axis and the Z-axis, in combination, may indicate user-preferred items for each user.

There may be a particular relationship between a certain taste and a certain item. For example, items liked by people liking abstract paintings may be different from items liked by people liking a realistic style of painting. In addition, a style of painting liked by a person fascinated by Chinese culture may be different from a style of painting liked by a person fascinated by European culture. As such, there may be a certain relationship between a taste and an item. The particular relationship between the certain taste and the certain item may be based on the data pre-learned by the computing device 300 or may be derived from a mapping table preset by a user.

The computing device 300 may select an item suited to the user tastes from among the user-preferred items, based on the relationship between a taste and an item.

An arrow in FIG. 6 illustrates an example mapping relation between a certain taste and a certain item. In FIG. 6, the item 1 may refer to an item related to liking abstract paintings. The computing device 300 may identify the item 1 having a relation between taste and item from between the two items, that is, the item 1 and the item 2, which are inferred as the user-preferred item candidates for the user 1, and may select the item 1 as the user-preferred item suited to the user tastes.

Figure 7:
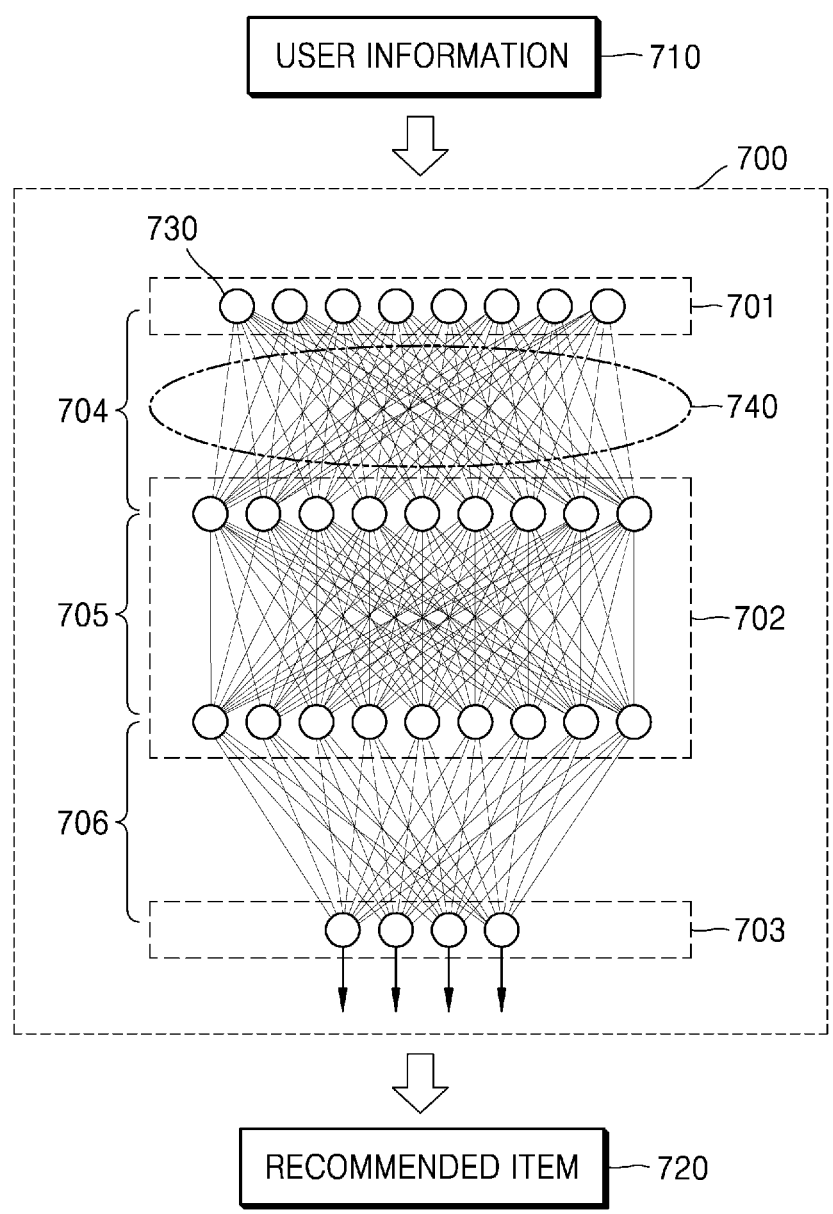
FIG. 7 is a diagram illustrating an example of the computing device inferring an item suited to user tastes from user information, according to various embodiments.

FIG. 7 is a diagram illustrating an example of a computing device 300 inferring an item suited to user tastes from user information, according to various embodiments.

Referring to FIG. 7, the computing device 300 may include a neural network 700. The neural network 700 may be a model trained to receive user information 710 input thereto and infer an item suited to user tastes using the user information 710. The computing device 300 may retrieve metadata corresponding to the input user information 710, may store the user information 710 and the metadata, and may make use thereof.

In an embodiment of the disclosure, the computing device 300 may impart unique metadata to each taste and item and compare the metadata for each taste and item with metadata corresponding to the user information 710, thereby determining whether there is a similarity therebetween.

The neural network 700 may include, for example, a deep neural network (DNN) including two or more hidden layers. The neural network 700 may include a structure of receiving input data, processing the input data through the hidden layers, and thereby outputting the processed data. The neural network 700 may use a collaborative filtering method.

The computing device 300 may respectively infer user-preferred items and user tastes from the user information 710, using the neural network 700.

FIG. 7 illustrates an example of a DNN in which the hidden layer of the neural network 700 has two depths.

The computing device 300 may analyze the user information 710 by performing computations through the neural network 700. The neural network 700 may be trained through training data. In addition, the trained neural network 700 may perform an inference computation that is a computation for analyzing the user tastes or the user-preferred items. Here, the neural network 700 may be designed in extremely various manners according to model implementation methods, the accuracy of results, the reliability of results, computation processing speeds and capacities of processors, and the like.

The neural network 700 may include, for example, an input layer 701, a hidden layer 702, and an output layer 703 and thus perform computations for genre determination. The neural network 700 may include a first layer 704 formed between the input layer 701 and a first hidden layer, a second layer 705 formed between the first hidden layer and a second hidden layer, and a third layer 706 formed between the second hidden layer and the output layer 703.

Each of the plurality of layers of the neural network 700 may include one or more nodes. For example, the input layer 701 may include one or more nodes 730 for receiving data. FIG. 7 illustrates an example in which the input layer 701 includes a plurality of nodes 730. In addition, the user information 710 may be input to the plurality of nodes 730. Two adjacent layers are connected to each other by a plurality of edges (for example, 740), as shown in FIG. 7. Because each node has a weight value corresponding thereto, the neural network 700 may obtain output data based on a value resulting from performing an arithmetic operation, for example, a multiplication operation, on an input signal and the weight value.

The neural network 700 may be trained based on a plurality of pieces of training data and thus established as a model for inferring the user-preferred items and the user tastes from the user information 710. For example, to improve the accuracy of results output through the neural network 700, the training may be repeatedly performed in a direction from the output layer 703 to the input layer 701 based on the plurality of pieces of training data, and the weight values may be modified to improve the accuracy of the output results.

In addition, the neural network 700 having the finally modified weight values may be used as a model for inferring an item suited to the user tastes. For example, the neural network 700 may analyze information included in the user information 710, which is input data, and thus output a recommended item 720 as a result.

Figure 8:
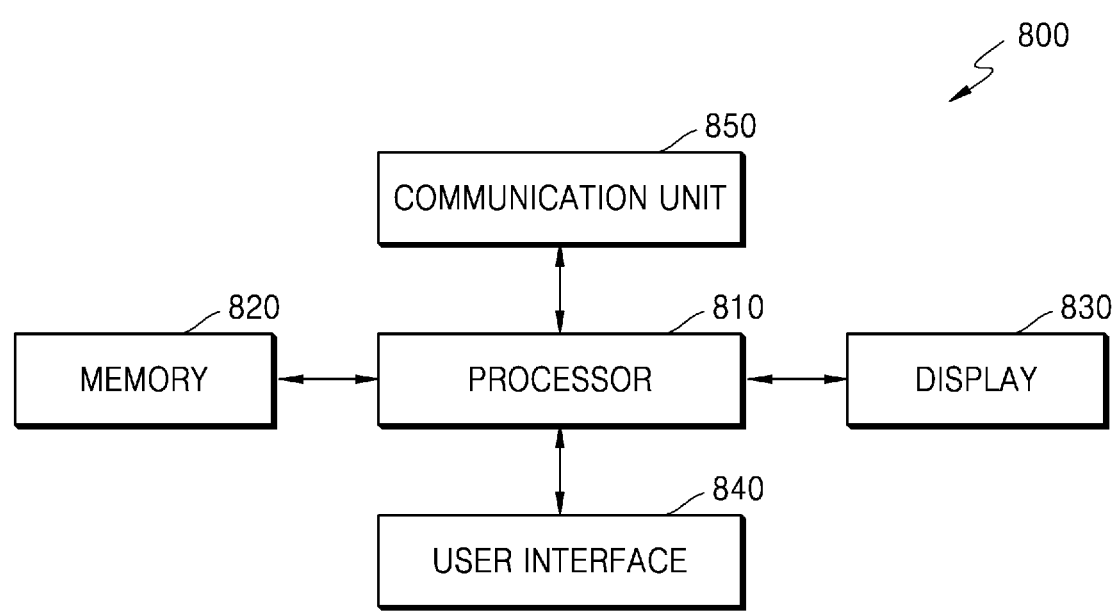
FIG. 8 is a block diagram illustrating an example configuration of an image display device according to various embodiments.

FIG. 8 is a block diagram illustrating an example image display device 800 according to various embodiments. Referring to FIG. 8, the image display device 800 may include a processor (e.g., including processing circuitry) 810, a memory 820, a display 830, a user interface (e.g., including interface circuitry) 840, and a communication unit (e.g., including communication circuitry) 850.

In an embodiment of the disclosure, it is assumed that the image display device 800 is configured separately from the computing device 300. The image display device 800 may be implemented by various electronic devices capable of communicating with external devices via communication networks and outputting images. The image display device 800 may be of a fixed type or a movable type. For example, the image display device 800 may include at least one of a desktop, a digital television (TV), a smart phone, a tablet personal computer (PC), a mobile phone, a video phone, an electronic book (e-book) reader, a laptop PC, a netbook computer, a digital camera, a personal digital assistant (PDA), a portable multimedia player (PMP), a camcorder, a navigation system, a wearable device, a smart watch, a home network system, a security system, or a medical device.

The processor 810 may include various processing circuitry and controls overall operations of the image display device 800. The processor 800 may execute at least one instruction stored in the memory 820 to control the image display device 800 to function.

In an embodiment of the disclosure, the processor 810 may execute the at least one instruction to transmit user history information to the computing device 300 external thereto via the communication unit 850. The user history information may include one or more of a user identification ID, identification information of an item used by a user, a method by which the user has used the item, start time of use of the item, and end time of use of the item.

In an embodiment of the disclosure, the user may directly input personal profile information via the user interface 840. In addition, the user may directly input information such as a director, a painter, a singer, music, a music genre, a style of painting, a favorite travel destination, or a hobby, which is preferred by the user. The processor 810 may transmit, to the computing device 300, the profile information or user-preferred items or tastes, which are input directly by the user.

In addition, the processor 810 may transmit the personal profile information of the user, information about user-preferred items, information about user tastes, or the like to the computing device 300 in various manners. For example, the processor 810 may notify information about a place where the image display device 800 is located, by transmitting an internet protocol (IP) address of the image display device 800 to the computing device 300. The computing device 300 may use a region where the user lives, as the user profile information, based on an address of the user, which is obtained from the IP address of the image display device 800, and in addition, the computing device 300 may use, as the personal profile information, an average income of the user from information about average incomes of neighbors living in the region where the user lives.

It may be assumed that, using the image display device 800, the user frequently purchases clothes, shoes, toys, or the like suited to girls aged from about 7 to about 8 and frequently views animations liked by children of that age. The processor 810 may transmit the corresponding history to the computing device 300, and the computing device 300 may use, as the personal profile information, information indicating that the user has a female child aged from about 7 to about 8, based on a viewing history, a purchase history, or the like of the user.

As another example, it may be assumed that, using the image display device 800, the user views movies by a particular director several times, searches for the director, and purchases books related to the director. The processor 810 may transmit such a history of the user to the computing device 300, and the computing device 300 may determine that the user has a high preference for the director, based on the search, viewing, or purchase history of the user, and may use this information as the user information.

As yet another example, it may be assumed that, using the image display device 800, the user searches for and purchases a lot of new electronic products such as the latest phones, the latest laptops, or the latest game consoles. The processor 810 may transmit such an item usage history of the user to the computing device 300, and the computing device 300 may determine that the user has a lot of interest in the latest electronic products, based on that history of the user, and may use this information as the user information.

As such, when the processor 810 transmits usage history information or the like of the user to the computing device 300, the computing device 300, based on the usage history, may obtain profile information of the user or may obtain information about items or tastes preferred by the user and thus use this information as the user information.

The memory 820 according to an embodiment of the disclosure may store at least one instruction. The memory 820 may store at least one program executed by the processor 810. In addition, the memory 820 may store data that is input to or output from the image display device 800.

The memory 820 may include at least one of a flash memory type storage medium, a hard disk type storage medium, a multimedia card micro type storage medium, card type memory (for example, SD memory, XD memory, or the like), RAM, SRAM, ROM, EEPROM, PROM, magnetic memory, a magnetic disk, or an optical disk.

The display 830 according to an embodiment of the disclosure may display content received from a broadcasting station, an external server, an external storage medium, or the like. The content may include a video signal, a text signal, or the like as a media signal.

In an embodiment of the disclosure, the display 830 may output an item suited to the user tastes, the item being received from the computing device 300. The display 830 may output both an item likely to be liked by the user and a description of the item. The description of the item may include attribute information of the item itself and a reason for recommending the item to the user.

In an embodiment of the disclosure, the display 830 may output a screen for interaction with the user. For example, when there are additional recommended items for the user from among items belonging to the same category, the display 830 may output a button allowing the user to view other recommended items. In addition, when the user wants to receive recommendations of items belonging to other categories rather than a current category, the display 830 may output a button allowing the user to view the items in the other categories. Alternatively, when the user wants to purchase a recommended item, the display 830 may output a button allowing the user to purchase the item.

When the display 830 is implemented by a touch screen, the display 830 may be used as an input device in addition to being used as an output device. For example, the display 830 may include at least one of a liquid crystal display, a thin film transistor-liquid crystal display, an organic light-emitting diode, a flexible display, a 3-dimensional (3D) display, or an electrophoretic display. In addition, according to an implementation type of the image display device 800, the image display device 800 may include two or more displays 830.

The user interface 840 according to an embodiment of the disclosure may include various interface circuitry and receive a user input for controlling the image display device 800. The user interface 840 may include, but is not limited to, various user input devices including a touch panel for sensing touches by the user, a button for receiving push operations of the user, a wheel for rotation operations of the user, a keyboard, a dome switch, a microphone for speech recognition, a motion sensing sensor for sensing motions, and the like. In addition, when the image display device 800 is operated by a remote controller (not shown), the user interface 840 may receive a control signal received from the remote controller.

According to an embodiment of the disclosure, the user may cause various functions of the image display device 800 to be performed by controlling the image display device 800 via the user interface 840. For example, using the user interface 840, the user may watch a particular movie via the image display device 800 or may purchase a particular item through a home shopping broadcast. Alternatively, using the user interface 840, the user may connect the image display device 800 to the Internet and thus search for a particular piece of content or a particular item.

The communication unit 850 according to an embodiment of the disclosure may include various communication circuitry and communicate with external devices (not shown) via wired or wireless networks. For example, the communication unit 850 may transmit signals to and receive signals from the external devices via the wired or wireless networks, according to control by the processor 810.

The external devices may include content providing servers, broadcasting station servers, electronic devices, or the like, which provide content that is output via the display 830, or may include information storage media such as universal serial bus (USB) storage media. In addition, the external devices may include servers, server systems, server-based devices, or the like, which perform transmission and reception of data with respect to the communication unit 850 and process the data.

In an embodiment of the disclosure, the communication unit 850 may communicate with the computing device 300 that infers items suited to the user tastes using a neural network. In an embodiment of the disclosure, the communication unit 850 may transmit, to the computing device 300, information about a user profile, user-preferred items, or the like directly input by the user, a history of use of the image display device 800 by the user, or the like. In addition, the communication unit 850 may receive information about the items suited to the user tastes, from the computing device 300.

The communication unit 850 may include at least one communication module including various communication circuitry, such as a short-range communication module, a wired communication module, a mobile communication module, or a broadcast receiving module. The communication module may be a communication module capable of performing transmission and reception of data through a tuner performing broadcast reception, or a network conforming to a communication specification such as Bluetooth, Wireless Local Area Network (WLAN) (WiFi), Wireless broadband (Wibro), World Interoperability for Microwave Access (Wimax), Code Division Multiple Access (CDMA), or Wideband CDMA (WCDMA).

Figure 9:
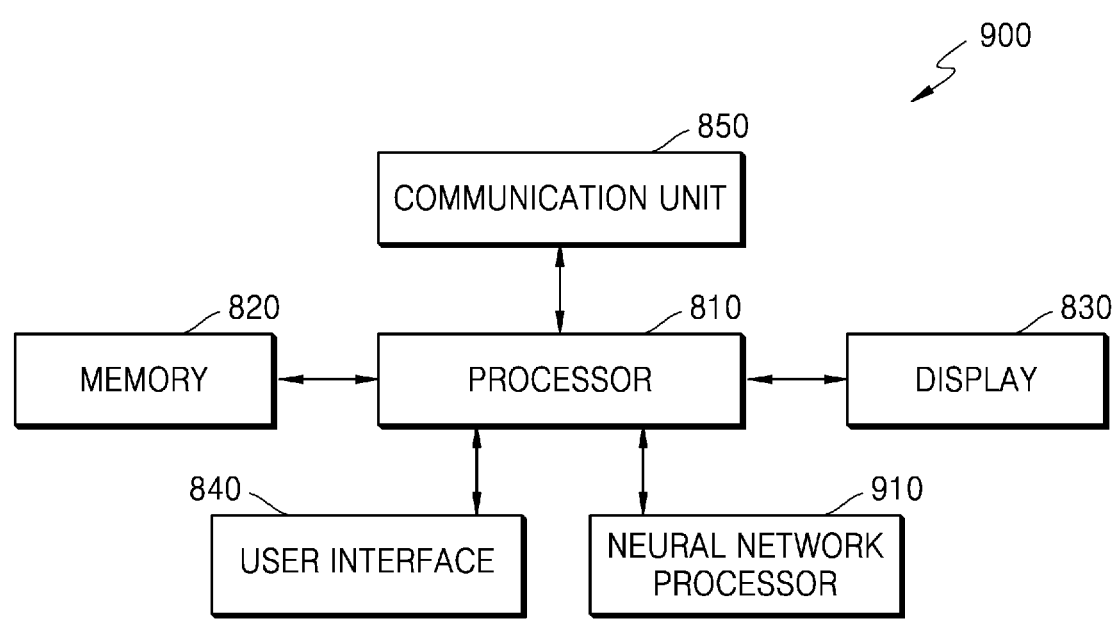
FIG. 9 is a block diagram illustrating an example image display device according to various embodiments.

FIG. 9 is a block diagram illustrating an example configuration of an example image display device 900 according to various embodiments. Referring to FIG. 9, the image display device 900 of FIG. 9 may include the components of the image display device 800 of FIG. 8. Accordingly, the same components as in FIG. 9 are denoted by the same reference numerals.

The image display device 900 shown in FIG. 9 may further include a neural network processor (e.g., including processing circuitry and/or executable program elements) 910, as compared with the image display device 800 shown in FIG. 8. That is, unlike the image display device 800 of FIG. 8, the image display device 900 of FIG. 9 may perform functions performed by the computing device 300, through the neural network processor 910 included in the image display device 900.

In an embodiment of the disclosure, the memory 810 may store metadata corresponding to user information in the form of a table or the like. In addition, the memory 810 may store an AI model used by the neural network processor 910. In an embodiment of the disclosure, the memory 810 may store pieces of metadata respectively corresponding to various items and tastes.

The neural network processor 910 may include various processing circuitry and/or executable program elements and perform computations through a neural network. The neural network processor 910 may perform computations through the neural network by executing one or more instructions.

In an embodiment of the disclosure, the neural network processor 910 may perform the functions performed by the computing device 300 described with reference to FIG. 3. In an embodiment of the disclosure, the neural network processor 910 may execute one or more instructions stored in the memory 820 to infer user-preferred item candidates and user tastes, based on the user information. The neural network processor 910 may be an algorithm for predicting future preferences based on similarity patterns from pre-learned data.

In an embodiment of the disclosure, the neural network processor 910 may learn a relationship between the user information and items in advance. Based on trained data obtained by collecting and analyzing information about behavior, activities, or preferences of a plurality of users, the neural network processor 910 may determine similarities between a current user and other users using user information of the current user and, according thereto, may predict items likely to be preferred by the current user.

In an embodiment of the disclosure, the neural network processor 910 may learn relationships between the user information and tastes in advance. The neural network processor 910 may predict the items likely to be preferred by the current user, based on the learned data collected from the plurality of users.

In an embodiment of the disclosure, the neural network processor 910 may learn item-related information and taste-related information of the plurality of users again on a regular cycle and thus update the learned data.

In an embodiment of the disclosure, the neural network processor 910 may impart a different weight to each item and may infer at least one of the user-preferred item candidates and the user tastes by considering the weight for each item.

In an embodiment of the disclosure, the neural network processor 910 may impart unique metadata to each item and make use thereof.

In an embodiment of the disclosure, the neural network processor 910 may obtain the user information from a history of use of the image display device 900 by the user, or the like. In an embodiment of the disclosure, the neural network processor 910 may determine that, among histories of use of the image display device 900 by the user, a history is valid only when the user has used the image display device 900 for certain time or more or a certain number of times or more, and may obtain the user information based thereon. For example, when the user watches a particular movie for certain time or less, for example, about 10 minutes, using the image display device 900 and then quit watching the movie, the neural network processor 910 may determine that this history of use is not valid, and may not use this history as the user information.

In the case where the user watches content using the image display device 900, only when the user watches the content for minimum reference time or more, for example, one hour or more, the neural network processor 910 may determine that such a history of watching the content is valid, and may obtain the user information based on the valid history. In another example, in the case where the user searches using the image display device 900, only when the user searches a certain number of times or more, the neural network processor 910 may determine that such a history of searching is valid, and may obtain the user information based on the history.

This is merely an example, and there may be various implementations about what user history could be determined to be valid by the neural network processor 910 to obtain the user information therefrom.

In an embodiment of the disclosure, the neural network processor 910 may transmit information to and receive information from at least one user equipment external to the image display device 900 via the communication unit 850. The neural network processor 910 may receive a history of use, by the user, of other user equipments rather than the image display device 800, from the external at least one user equipment via the communication unit 850. The neural network processor 910 may obtain the user information, based on the history of use received from the external at least one user equipment in addition to the history of use of the image display device 800 by the user.

In an embodiment of the disclosure, when the neural network processor 910 obtains the user information, the neural network processor 910 may retrieve metadata corresponding to the user information from the memory 820 and may make use thereof.

In an embodiment of the disclosure, the neural network processor 910 may determine similarities by comparing the metadata corresponding to the user information with unique metadata of items and tastes and, based thereon, may compare behavior patterns or preferences related to the items or tastes between a particular user and other users, thereby inferring item candidates likely to be preferred by the particular user and inferring tastes of the particular user.

In an embodiment of the disclosure, the neural network processor 910 may select an item suited to the user tastes by considering both the inferred user tastes and the inferred user-preferred item candidates. The neural network processor 910 may output the selected item via the display 830.

Figure 10:
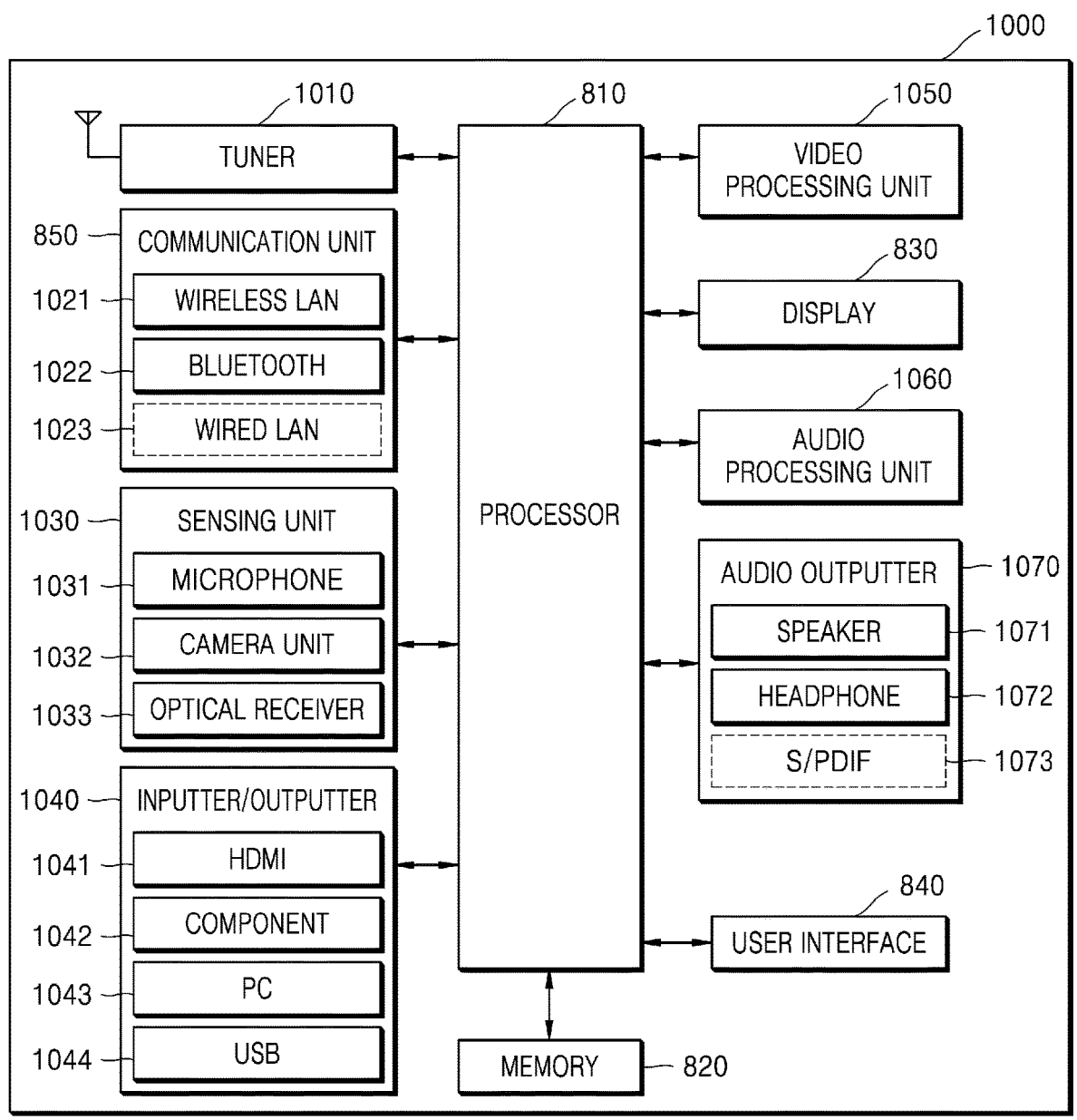
FIG. 10 is a block diagram illustrating an example image display device according to various embodiments.

FIG. 10 is a block diagram illustrating an example image display device 1000 according to various embodiments. Referring to FIG. 10, the image display device 1000 of FIG. 10 may include a tuner 1010, a sensing unit (e.g., including various sensors and/or sensing circuitry) 1030, inputter/outputter (e.g., including input/output circuitry) 1040, a video processing unit (e.g., including video processing circuitry) 1050, an audio processing unit (e.g., including audio processing circuitry) 1060, and an audio outputter (e.g., including audio output circuitry) 1070, in addition to the processor 810, the memory 820, the display 830, the user interface 840, and the communication unit 850.

The image display device 1000 of FIG. 10 may include the components of the image display device 800 of FIG. 8. Therefore, regarding the processor 810, the memory 820, the display 830, the user interface 840, and the communication unit 850, repeated descriptions given with reference to FIG. 8 may not be repeated here.

The tuner 1010 may tune and select only a frequency of a channel intended to be received by the image display device 1000 from among a lot of radio wave components through amplification, mixing, resonance, and the like of broadcast content and the like received in a wired or wireless manner. The content received through the tuner 1010 undergoes decoding (for example, audio decoding, video decoding, or side information decoding) and thus is divided into audio, video, and/or side information. The divided audio, video, and/or side information may be stored in the memory 820 by control by the processor 810.

The communication unit 850 may include at least one communication module including various communication circuitry, such as a short-range communication module, a wired communication module, a mobile communication module, or a broadcast receiving module. Here, the at least one communication module refers to a communication module capable of performing transmission and reception of data through a tuner performing broadcast reception, or a network conforming to a communication specification such as Bluetooth, WLAN (Wi-Fi), Wibro, Wimax, CDMA, or WCDMA.

The communication unit 850 may connect the image display device 1000 to an external device or a server by control by the processor 810. The image display device 1000 may download a program or an application required by the image display device 1000 from the external device or the server via the communication unit 850 or may perform web browsing via the communication unit 850.

In an embodiment of the disclosure, the communication unit 850 may connect the image display device 1000 to the computing device 300. The image display device 1000 may transmit a user history to the computing device 300 connected via the communication unit 850 and may download information about items suited to user tastes generated by the computing device 300 based on user information or may receive the information in real time.

The communication unit 850 may include various communication circuitry included in various ones of a WLAN (e.g., wireless LAN) unit 1021, a Bluetooth unit 1022, and a wired Ethernet (e.g., wired LAN) unit 1023. In addition, the communication unit 850 may include a combination of the WLAN unit 1021, the Bluetooth unit 1022, and the wired Ethernet unit 1023. The communication unit 850 may receive a control signal via a control device (not shown) such as a remote controller, by control by the processor 810. The control signal may be implemented in a Bluetooth type, a radio frequency (RF) signal type, or a Wi-Fi type. The communication unit 850 may further include another short-range communication unit (for example, a near field communication (NFC) unit (not shown), or a Bluetooth low energy (BLE) unit (not shown)) in addition to the Bluetooth unit 1022. According to an embodiment of the disclosure, the communication unit 850 may transmit connection signals to and receive connection signals from an external device or the like via the short-range communication unit such as the Bluetooth unit 1022 or the BLE unit.

The sensing unit 1030 may include various sensors and/or sensing circuitry and sense speeches, images, or interactions of a user and may include a microphone 1031, a camera unit 1032, and an optical receiver 1033. The microphone 1031 may receive a speech uttered by the user, and may convert the receive speech into an electric signal and output the electric signal to the processor 810.

The camera unit 1032 may include a sensor (not shown) and a lens (not shown) and may take an image formed on a screen.

The optical receiver 1033 may receive an optical signal (including a control signal). The optical receiver 1033 may receive an optical signal corresponding to a user input (for example, a touch, a press, a touch gesture, a speech, or a motion) from a control device (not shown) such as a remote controller or a mobile phone. A control signal may be extracted from the received optical signal by control by the processor 810.

The inputter/outputter 1040 may include various input/output circuitry and receive, by control by the processor 810, video (for example, video signals, still image signals, or the like), audio (for example, a speech signal, a music signal, or the like), side information (for example, a description of content, a content title, or a content storage location), and the like from a server external to the image display device 1000, or the like. The inputter/outputter 1040 may include, for example, one or more of a high-definition multimedia interface (HDMI) port 1041, a component jack 1042, a PC port 1043, and a USB port 1044. The inputter/outputter 1040 may include a combination of the HDMI port 1041, the component jack 1042, the PC port 1043, and the USB port 1044.

The video processing unit 1050 may include various video processing circuitry and process image data to be displayed by the display 830 and may perform various image processing operations, such as decoding, rendering, scaling, noise filtering, frame rate conversion, and resolution conversion, on the image data.

The audio processing unit 1060 may include various audio processing circuitry and performs processing on audio data. The audio processing unit 1060 may perform various processing, such as decoding, amplification, and noise filtering, on the audio data.

The audio outputter 1070 may include various output circuitry and output audio that is included in content received via the tuner 1010, audio that is input via the communication unit 850 or the inputter/outputter 1040, or audio stored in the memory 820, by control by the processor 810. The audio outputter 1070 may include at least one of a speaker 1071, a headphone output terminal 1072, or a Sony/Philips Digital Interface (S/PDIF) output terminal 1073.

Figure 11:
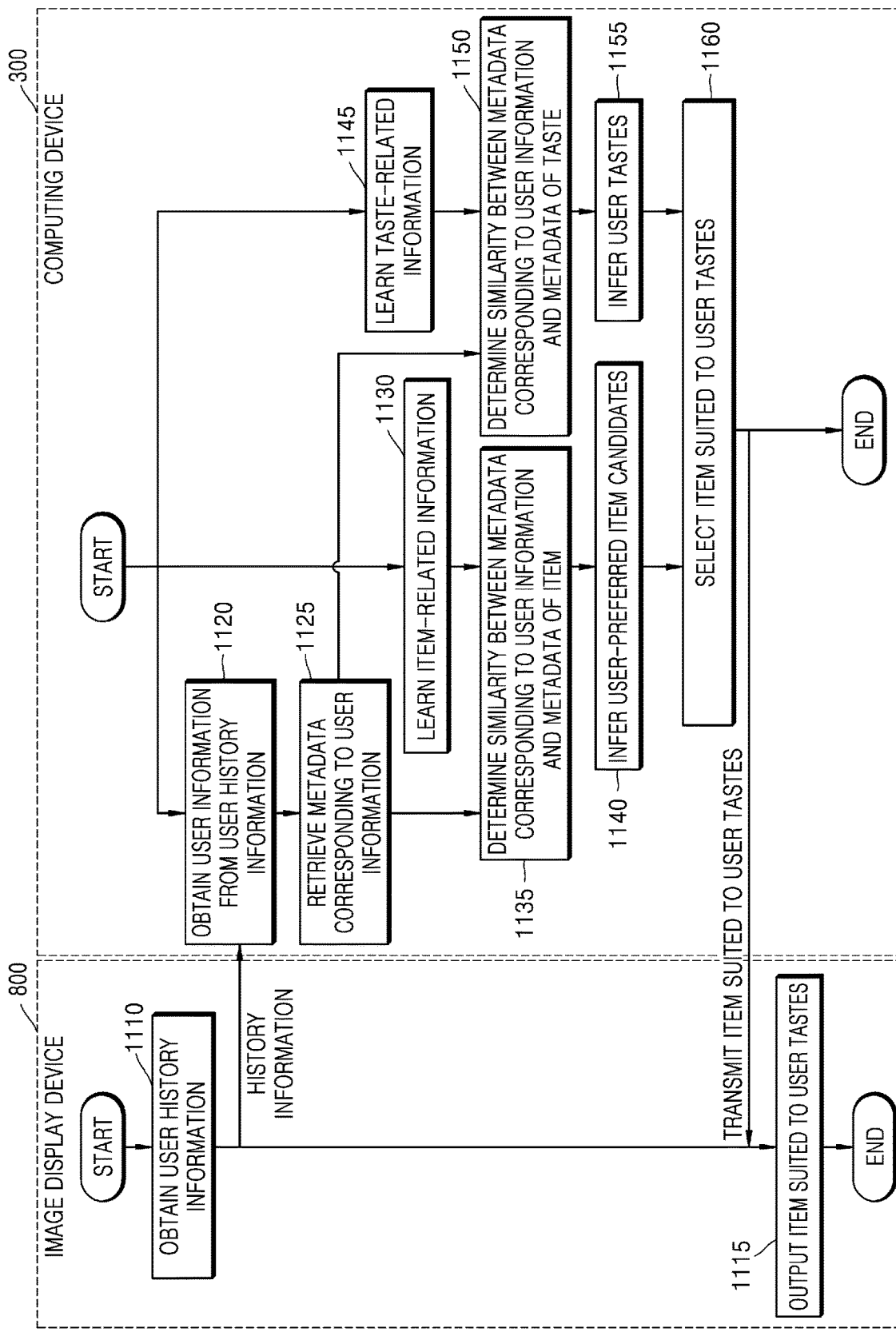
FIG. 11 is a flowchart illustrating an example process, performed by the computing device and the image display device, of providing an item suited to user tastes when the computing device is not included in the image display device, according to various embodiments.

FIG. 11 is a flowchart illustrating an example process, performed by the computing device 300 and the image display device 800, of providing an item suited to user tastes, when the computing device 300 is not included in the image display device 800, according to various embodiments.

Referring to FIG. 11, the computing device 300 may be configured separately from the image display device 800. The computing device 300 may transmit information to and receive information from the image display device 800 via a communication network.

A user may use the image display device 800 in accordance with functions thereof. The image display device 800 may obtain user history information, based on a history of use of the image display device 800 by the user (operation 1110) The user history information may include one or more of a user identification ID, identification information of an item used by the user, an item usage method of the user, start time of item usage, and end time of item usage. The image display device 800 may transmit the obtained user history information to the computing device 300 via the communication network.

The computing device 300 may receive the user history information from the image display device 800 via the communication network and may obtain user information from the user history information (operation 1120). The computing device 300 may determine whether the user history information is a valid usage history conforming to a criterion. The computing device 300 may have a different criterion for each item usage method. For example, when the item usage method is watching, the computing device 300 may determine that a corresponding usage history is valid only when a watching time period is one hour or more. In addition, when the item usage method is searching, the computing device 300 may determine that a corresponding usage history is valid only when searching is performed three times or more using the same or similar keyword.

The computing device 300 may obtain the user information using only the valid usage history from among the user history information. The user information may include at least one of personal profile information of the user, preferred item information of the user, or taste information of the user.

The computing device 300 may retrieve metadata corresponding to the user information (operation 1125). The computing device 300 may use the user information and the metadata corresponding thereto, both together.

In an embodiment of the disclosure, the computing device 300 may learn item-related information in advance (operation 1130). Using unique metadata imparted to each item, the computing device 300 may determine similarity thereof to the metadata corresponding to the user information (operation 1135). The computing device 300 may infer user-preferred item candidates from trained data and the user information (operation 1140).

In an embodiment of the disclosure, the computing device 300 may learn taste-related information in advance (operation 1145). Using unique metadata imparted to each taste, the computing device 300 may determine similarity thereof to the metadata corresponding to the user information (operation 1150). The computing device 300 may infer user tastes from learned data and the user information (operation 1155).

The computing device 300 may select an item suited to the user tastes, based on the user tastes and the user-preferred item candidates (operation 1160). The item selected by the computing device 300 may include one item or a plurality of items. When the item selected by the computing device 300 includes a plurality of items, the plurality of items may belong to the same category or different categories from each other.

The computing device 300 may transmit the selected item to the image display device 800 via the communication network.

The image display device 800 may output the item suited to the user tastes and received from the computing device 300 (operation 1115).

Figure 12:
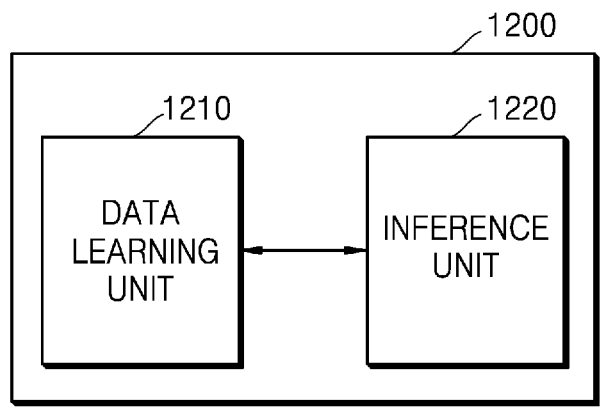
FIG. 12 is a block diagram illustrating an example configuration of a computing device according to various embodiments.

FIG. 12 is a block diagram illustrating an example configuration of a computing device 1200 according to various embodiments.

Referring to FIG. 12, the computing device 1200 may include a data learning unit (e.g., including processing circuitry and/or executable program elements) 1210 and an inference unit (e.g., including processing circuitry and/or executable program elements) 1220.

The data learning unit 1210 may include various processing circuitry and/or executable program elements and learn criteria for determining at least one of user tastes or user-preferred items by obtaining data used for learning and by applying the obtained data to the inference unit 1220 described below.

The data learning unit 1210 may learn, in advance, at least one of a relationship between a history and an item, an item usage history of another person, or a different item preferred by a user using a certain item. The data learning unit 1210 may learn, in advance, at least one of a relationship between a history and a taste, a taste history of another person, or a different taste preferred by the user having a certain taste. In addition, the data learning unit 1210 may learn criteria for inferring the user tastes using user information. Further, the data learning unit 1210 may learn criteria for inferring the user-preferred items using the user information.

The inference unit 1220 may include various processing circuitry and/or executable program elements and infer the user tastes from the user information using a trained model. The inference unit 1220 may impart a different weight to each category according to criteria preset by learning and may infer the user tastes by considering the weight imparted to each category.

In addition, the inference unit 1220 may infer user-preferred item candidates from the user information using the trained model. The inference unit 1220 may impart a different weight to each category according to the criteria preset by learning and may infer the user-preferred item candidates by considering the weight imparted to each category.

The inference unit 1220 may find metadata corresponding to the user information. The inference unit 1220 may compare the metadata corresponding to the user information with metadata of each item and taste and determine whether a degree of matching is greater than a certain reference value, thereby inferring each of the user-preferred item candidates and the user tastes.

In addition, the inference unit 1220 may perform mapping between the user tastes and the user-preferred items candidates. The inference unit 1220 may select an item suited to the user tastes from among the user-preferred item candidates, based on information about a relationship between a taste and an item. In an embodiment of the disclosure, the data learning unit 1210 may learn the information about the relationship between a taste and an item in advance. Alternatively, in another embodiment of the disclosure, the relationship between a taste and an item may be set up in advance by the user using the computing device 1200.

An inference result obtained by the inference unit 1220 may be input as an input value to the data learning unit 1210 and thus used as additional training data.

At least one of the data learning unit 1210 or the inference unit 1220 may be manufactured in the form of at least one hardware chip and mounted in an electronic device. For example, at least one of the data learning unit 1210 or the inference unit 1220 may be manufactured in the form of a dedicated hardware chip for AI, or may be manufactured as a portion of an existing general-purpose processor (for example, a central processing unit (CPU) or an application processor) or an existing dedicated graphic processor (for example, a graphic processing unit (GPU)) and mounted in the various electronic devices described above.

In this case, the data learning unit 1210 and the inference unit 1220 may be mounted in one electronic device or may be respectively mounted in separate electronic devices. For example, one of the data learning unit 1210 and the inference unit 1220 may be included in an electronic device, and the other one may be included in a server. In addition, the data learning unit 1210 may communicate with the inference unit 1220 in a wired or wireless manner, and thus, the data learning unit 1210 may provide information about a model established by the data learning unit 1210 to the inference unit 1220, and data input to the inference unit 1220 may be provided as additional training data to the data learning unit 1210.

At least one of the data learning unit 1210 or the inference unit 1220 may be implemented by a software module. When at least one of the data learning unit 1210 or the inference unit 1220 is implemented by a software module (or a program module including instructions), the software module may be stored in a non-transitory computer-readable medium. In addition, in this case, at least one software module may be provided by an operating system (OS) or a certain application. Alternatively, portions of the at least one software module may be provided by the OS, and the other portions may be provided by the certain application.

Figure 13:
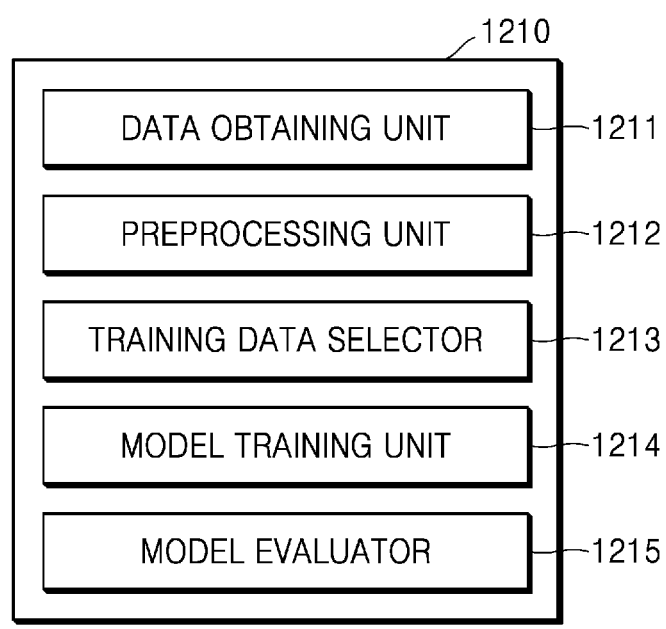
FIG. 13 is a block diagram illustrating an example data learning unit, according to various embodiments.

FIG. 13 is a block diagram illustrating an example configuration of the data learning unit 1210, according to various embodiments.

Referring to FIG. 13, the data learning unit 1210 according to an embodiment of the disclosure may include a data obtaining unit (e.g., including processing circuitry and/or executable program elements) 1211, a preprocessing unit (e.g., including processing circuitry and/or executable program elements) 1212, a training data selector (e.g., including processing circuitry and/or executable program elements) 1213, a model training unit (e.g., including processing circuitry and/or executable program elements) 1214, and a model evaluator (e.g., including processing circuitry and/or executable program elements) 1215.

The data obtaining unit 1211 may include various processing circuitry and/or executable program elements and obtain data regarding patterns of expression of preference and interest of a plurality of users. The data obtaining unit 1211 may obtain data from at least one external server such as a social network server or a cloud server, which is connected to the computing device 1200 via a network, or may obtain data from a database.

The data obtaining unit 1211 may obtain data required for training to infer tastes and preferred items of the user.

To allow the obtained data to be used for training to infer user tastes or user-preferred items from user information, the preprocessing unit 1212 may include various processing circuitry and/or executable program elements and preprocess the obtained data. To allow the model training unit 1214 described below to use the obtained data for training to infer the user tastes or the user-preferred items from the user information, the preprocessing unit 1212 may process the obtained data into a preset format. For example, although the preprocessing unit 1212 may process the obtained data into the preset format through removal of repeated data or not used data from the obtained data, vectorization of metadata corresponding to each piece of data, or the like, the disclosure is not limited thereto.

The training data selector 1213 may include various processing circuitry and/or executable program elements and select data required for training from the preprocessed data. The selected data may be provided to the model training unit 1214. The training data selector 1213 may select the data required for training from the preprocessed data, according to criteria preset to infer the user tastes or the user-preferred items. In an embodiment of the disclosure, the training data selector 1213 may select pieces of data helpful in inferring tastes or preferred items from the user information. In addition, the training data selector 1213 may select data according to criteria preset by training by the model training unit 1214 described below.

The model training unit 1214 may include various processing circuitry and/or executable program elements and learn criteria regarding what training data needs to be used to infer the tastes or the preferred items from the user information. For example, the model training unit 1214 may learn the number, types, or levels of metadata attributes, which are used to infer the user tastes or the user-preferred items, from metadata obtained from the user information.

In addition, the model training unit 1214 may train a data inference model used to infer the user tastes or the user-preferred items, using the training data. In this case, the data inference model may include a pre-established model. For example, the data inference model may include a model pre-established by receiving basic training data as input.

The data inference model may include, for example, a model that is based on a neural network. For example, although a model such as collaborative filtering may be used as the data inference model, the disclosure is not limited thereto.

According to various embodiments of the disclosure, when there are a plurality of pre-established data inference models, the model training unit 1214 may determine a data inference model having a high correlation between input training data and basic training data as the data inference model to be trained. In this case, the basic training data may be pre-classified for each type of data, and the data inference model may be pre-established for each type of data. For example, the basic training data may be pre-classified according to various criteria, such as a generation region of training data, a generation time point of training data, the size of training data, the genre of training data, a creator of training data, or the type of object in training data.

In addition, the model training unit 1214 may train the data inference model using, for example, a training algorithm including error back-propagation or gradient descent.

Further, the model training unit 1214 may train the data inference model through, for example, supervised learning in which training data is taken as an input value. In addition, the model training unit 1214 may train the data inference model through, for example, unsupervised learning in which criteria for determining a state of the user are found by learning, by itself, types of data required to determine the state of the user without particular supervision. Further, the model training unit 1214 may train the data inference model through, for example, reinforcement learning which uses feedback on whether a result of determining the state of the user according to training is correct.

In addition, when the data inference model is trained, the model training unit 1214 may store the trained data inference model. In this case, the model training unit 1214 may store the trained data inference model in a memory. The model training unit 1214 may store the trained data inference model in a memory of a device including the inference unit 1220 described below. The model training unit 1214 may store the trained data inference model in a memory of a server connected to an electronic device via a wired or wireless network.

In this case, the memory, in which the trained data inference model is stored, may also store, for example, commands or data related to at least one other component of the device. In addition, the memory may store software and/or a program. The program may include, for example, a kernel, middleware, an application programming interface (API), and/or an application program (or "application").

When evaluation data is input to the data inference model and an inference result output from the evaluation data does not satisfy a certain criterion, the model evaluator 1215 which may include various processing circuitry and/or executable program elements, may cause the model training unit 1214 to be trained again. In this case, the evaluation data may be data preset to evaluate the data inference model.

For example, when, in recognition results of the trained data inference model with respect to the evaluation data, the number or proportion of pieces of evaluation data resulting in incorrect inference results exceeds a preset threshold value, the model evaluator 1215 may determine that the certain criterion is not satisfied. For example, in the case where the certain criterion is defined as a proportion of 2%, when the trained data inference model outputs incorrect inference results with respect to more than 20 pieces of evaluation data from among a total of 1000 pieces of evaluation data, the model evaluator 1215 may determine that the trained data inference model is not suitable.

When there are a plurality of trained data inference models, the model evaluator 1215 may evaluate whether each trained data inference model satisfies the certain criterion and may determine a model satisfying the certain criterion as a final data inference model. In this case, when there are a plurality of models satisfying the certain criterion, the model evaluator 1215 may determine, as the final data inference model, one model or a certain number of models in decreasing order of scores from highest, according to a presetting in terms of the number of models.

At least one of the data obtaining unit 1211, the preprocessing unit 1212, the training data selector 1213, the model training unit 1214, or the model evaluator 1215 in the data learning unit 1210 may be implemented in the form of at least one software chip and thus mounted in an electronic device. For example, at least one of the data obtaining unit 1211, the preprocessing unit 1212, the training data selector 1213, the model training unit 1214, or the model evaluator 1215 may be manufactured in the form of a dedicated hardware chip for AI, or may be manufactured as a portion of an existing general-purpose processor (for example, a CPU or an application processor) or an existing dedicated graphic processor (for example, a GPU) and mounted in the various electronic devices described above.

In addition, the data obtaining unit 1211, the preprocessing unit 1212, the training data selector 1213, the model training unit 1214, and the model evaluator 1215 may be mounted in one electronic device or may be respectively mounted in separate electronic devices. In an embodiment of the disclosure, the electronic device may include a computing device, an image display device, or the like. For example, some of the data obtaining unit 1211, the preprocessing unit 1212, the training data selector 1213, the model training unit 1214, and the model evaluator 1215 may be included in the electronic device, and the others may be included in a server.

In addition, at least one of the data obtaining unit 1211, the preprocessing unit 1212, the training data selector 1213, the model training unit 1214, or the model evaluator 1215 may be implemented by a software module. When at least one of the data obtaining unit 1211, the preprocessing unit 1212, the training data selector 1213, the model training unit 1214, or the model evaluator 1215 is implemented by a software module (or a program module including instructions), the software module may be stored in a non-transitory computer-readable medium. In addition, in this case, at least one software module may be provided by an OS or a certain application. Alternatively, portions of the at least one software module may be provided by the OS, and the other portions may be provided by the certain application.

Figure 14:
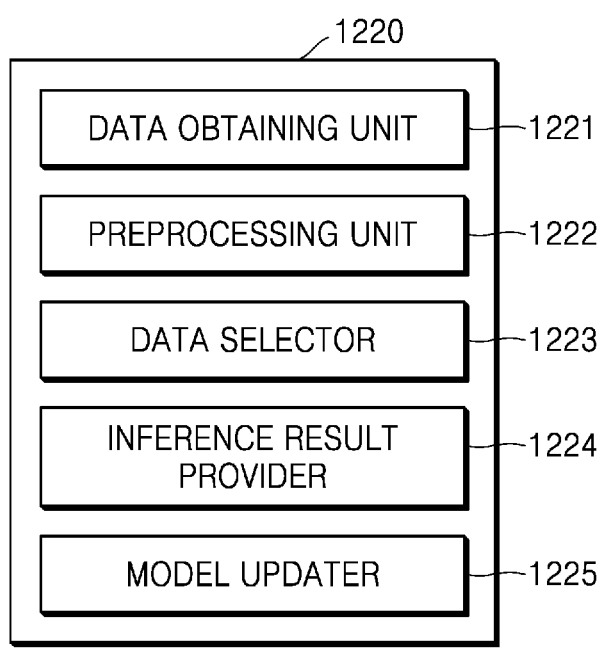
FIG. 14 is a block diagram illustrating an example configuration of an inference unit, according to various embodiments.

FIG. 14 is a block diagram illustrating an example configuration of the inference unit 1220, according to various embodiments.

Referring to FIG. 14, the inference unit 1220 according to various embodiments of the disclosure may include the data obtaining unit (e.g., including processing circuitry and/or executable program elements) 1221, the preprocessing unit (e.g., including processing circuitry and/or executable program elements) 1222, a data selector (e.g., including processing circuitry and/or executable program elements) 1223, an inference result provider (e.g., including processing circuitry and/or executable program elements) 1224, and a model updater (e.g., including processing circuitry and/or executable program elements) 1225.

The data obtaining unit 1221 may include various processing circuitry and/or executable program elements and obtain data for inferring items suited to user tastes from user information. The data for inferring the items suited to the user tastes may include information such as item usage patterns, preference patterns, or taste patterns of a plurality of users, or similarities between items, between tastes, or between items and tastes.

The preprocessing unit 1222 may include various processing circuitry and/or executable program elements and preprocess the obtained data for the obtained data to be able to be used. For the inference result provider 1224 described below to be able to use the obtained data for inferring the user tastes or user-preferred items, the preprocessing unit 1222 may process the obtained data into a preset format.

The data selector 1223 may include various processing circuitry and/or executable program elements and select data required to infer the user tastes or the user-preferred items from the preprocessed data. The selected data may be provided to the inference result provider 1224. The data selector 1223 may select some or all of the preprocessed data, according to criteria preset to infer the user tastes or the user-preferred items.

The inference result provider 1224 may include various processing circuitry and/or executable program elements and infer the items suited to the user tastes by applying the selected data to a data inference model. The inference result provider 1224 may provide an inference result according to an inference objective of data. The inference result provider 1224 may apply the selected data to the data inference model using, as an input value, the data selected by the data selector 1223. In addition, the inference result may be determined by the data inference model.

The inference result provider 1224 may provide the user tastes or the user-preferred items, which are inferred from the user information. For example, the inference result provider 1224 may provide information about categories to which identified items belong, or the like.

The model updater 1225 may include various processing circuitry and/or executable program elements and allow the data inference model to be updated, based on evaluation of the inference result provided by the inference result provider 1224. For example, the model updater 1225 may allow the model training unit 1214 to update the data inference model, by providing the inference result, which is provided by the inference result provider 1224, to the model training unit 1214.

At least one of the data obtaining unit 1221, the preprocessing unit 1222, the data selector 1223, the inference result provider 1224, or the model updater 1225 may be manufactured in the form of at least one hardware chip and thus mounted in an electronic device. For example, at least one of the data obtaining unit 1221, the preprocessing unit 1222, the data selector 1223, the inference result provider 1224, or the model updater 1225 may be manufactured in the form of a dedicated hardware chip for AI, or may be manufactured as a portion of an existing general-purpose processor (for example, a CPU or an application processor) or an existing dedicated graphic processor (for example, a GPU) and mounted in the various electronic devices described above.

In addition, the data obtaining unit 1221, the preprocessing unit 1222, the data selector 1223, the inference result provider 1224, and the model updater 1225 may be mounted one electronic device or may be respectively mounted in separate electronic devices. For example, some of the data obtaining unit 1221, the preprocessing unit 1222, the data selector 1223, the inference result provider 1224, and the model updater 1225 may be included in the electronic device, and the others may be included in a server.

In addition, at least one of the data obtaining unit 1221, the preprocessing unit 1222, the data selector 1223, the inference result provider 1224, or the model updater 1225 may be implemented by a software module. When at least one of the data obtaining unit 1221, the preprocessing unit 1222, the data selector 1223, the inference result provider 1224, or the model updater 1225 is implemented by a software module (or a program module including instructions), the software module may be stored in a non-transitory computer-readable medium. In addition, in this case, at least one software module may be provided by an OS or a certain application. Alternatively, portions of the at least one software module may be provided by the OS, and the other portions may be provided by the certain application.

A computing device and an operation method thereof, according to various embodiments of the disclosure, may be implemented in the form of a recording medium including instructions executable by a computer, such as a program module executed by the computer. A computer-readable medium may be any available medium accessible by a computer and may include volatile and non-volatile media and separable and non-separable media. In addition, the computer-readable medium may include a computer storage medium and a communication medium. The computer storage medium includes volatile and non-volatile media and separable and non-separable media, which are implemented by any method or technique for storing information such as computer-readable instructions, data structures, program modules, or other data. The communication medium typically includes computer-readable instructions, data structures, program modules, other data in modulated data signals such as carrier waves, or other transmission mechanisms, and includes any information transfer medium.

In addition, the term such as " . . . unit" or " . . . portion" used herein may refer to a hardware component such as a processor or a circuit, and/or a software component executed by the hardware component such as a processor.

Further, an operation method of the above-described computing device according to embodiments of the disclosure may be implemented by a computer program product including a recording medium having stored therein a computer program for performing the operation method of the computing device, the operation method including: obtaining user information; inferring user-preferred item candidates using a first neural network, based on the user information; inferring user tastes using a second neural network, based on the user information; and providing an item suited to the user tastes from among the user-preferred item candidates.

The computing device and method thereof according to an embodiment of the disclosure may infer tastes of the user and item candidates likely to be preferred by the user, based on limited user information.

The computing device and method thereof according to an embodiment of the disclosure may infer the tastes of the user and the item candidates likely to be preferred by the user, even regarding a different field with no user history.

The computing device and method thereof according to an embodiment of the disclosure may select and provide an item suited to the user tastes using a plurality of neural network.

It will be understood by one of ordinary skill in the art that the embodiments of the disclosure are provide for illustration and may be implemented in different ways without departing from the true spirit and full scope of the disclosure. Therefore, it should be understood that the foregoing example embodiments of the disclosure are provided for illustrative purposes only and are not to be construed in any way as limiting the disclosure. For example, each component described as a single type may be implemented in a distributed manner, and likewise, components described as being distributed may be implemented as a combined type.

What is claimed is:

1. A computing device comprising:
a memory storing one or more instructions; and
at least one hardware processor configured to execute the one or more instructions stored in the memory to:
store in the memory user information obtained from at least one user equipment;
learn, in advance by the at least one hardware processor executing a first neural network, first data and infer user-preferred item candidates based on the first data obtained from the learning and the user information stored in the memory, the first data including at least one of a relationship between a history and an item, an item usage history of another person, or information about a different item preferred by a user of a certain item;
wherein the user-preferred item candidates inferred by the first neural network include different items that are not included in the user information;
learn, in advance by the at least one hardware processor executing a second neural network, second data and infer user tastes based on the second data obtained from the learning and the user information stored in the memory, the second data including at least one of a relationship between a history and a taste, a taste history of another person, or information about a different taste preferred by a user having a certain taste; and select and provide an item suited to the user tastes inferred by the second neural network, from among the different items that are not included in the user information within the user-preferred item candidates inferred by the first neural network, using information about relationships between tastes and items.

2. The computing device of claim 1, wherein the at least one hardware processor is further configured to execute the one or more instructions to: impart a different weight to each category of item candidates; and infer at least one of the user-preferred item candidates or the user tastes based on the weight for each category.

3. The computing device of claim 1, wherein the at least one neural network is configured to learn by receiving feedback on at least one of a result of inferring the user-preferred item candidates or a result of inferring the user tastes.

4. The computing device of claim 1, wherein the at least one neural network is configured to use a collaborative filtering model.

5. The computing device of claim 1, wherein each item and each taste possesses metadata unique thereto, and the processor is further configured to execute the one or more instructions to infer the user-preferred item candidates and the user tastes by comparing metadata corresponding to the user information with the metadata of each item and taste.

6. The computing device of claim 1, wherein the user information comprises one or more of an item usage history of a user, an item preference of the user, profile information of the user, and information about tastes or preferences of the user for various categories.

7. The computing device of claim 1, further comprising a communication unit comprising communication circuitry configured to transmit signals to and receive signals from the at least one user equipment, wherein the at least one hardware processor is further configured to execute the one or more instructions to: receive the user information input from the at least one user equipment via the communication unit; and transmit the item suited to the user tastes from among the user-preferred item candidates to at least one of the at least one user equipment via the communication unit.

8. The computing device of claim 1, further comprising:
a communication unit comprising communication circuitry configured to transmit signals to and receive signals from at least one user equipment;
a display displaying an image; and
a user interface comprising circuitry configured to receive the user information input thereto,
wherein the at least one hardware processor is further configured to execute the one or more instructions to: receive the user information input from at least one of the user interface or the at least one user equipment; select the item suited to the user tastes from among the user-preferred item candidates based on the user information; and output the selected item via the display.

9. An image display device comprising:
a communication unit comprising communication circuitry and communicates with a computing device;
a display configured to display an image;
a user interface comprising circuitry configured to receive user information as an input;
a memory storing one or more instructions; and
at least one hardware processor configured to execute the one or more instructions stored in the memory to:
transmit the user information input via the user interface to the computing device via the communication unit;
receive information about an item suited to user tastes via the communication unit, the user tastes being obtained by the computing device based on the user information using at least one neural network; and
output the information about the item suited to the user tastes via the display,
wherein the computing device is configured to:
receive user information from at least one user equipment including the image display device;
learn, in advance by the at least one hardware processor executing a first neural network, first data and infer user-preferred item candidates based on the first data obtained from the learning and the user information, the first data including at least one of a relationship between a history and an item, an item usage history of another person, or information about a different item preferred by a user of a certain item;
wherein the user-preferred item candidates inferred by the first neural network include different items that are not included in the user information;
learn, in advance by the at least one hardware processor executing a second neural network, second data and infer user tastes based on the second data obtained from the learning and the user information, the second data including at least one of a relationship between a history and a taste, a taste history of another person, or information about a different taste preferred by a user having a certain taste; and
select and provide the information about the item suited to the user tastes inferred by the second neural network, from among the different items that are not included in the user information within the user-preferred item candidates inferred by the first neural network, using information about relationships between tastes and items.

10. A method of operating a computing device, the method comprising:
obtaining user information;
learning, in advance using a first neural network, first data and inferring user-preferred item candidates based on the first data obtained from the learning and the user information, the first data including at least one of a relationship between a history and an item, an item usage history of another person, or information about a different item preferred by a user of a certain item;
wherein the user-preferred item candidates inferred by the first neural network include different items that are not included in the user information;
learning, in advance using a first neural network, second data and inferring user tastes based on the second data obtained from the learning and the user information, the second data including at least one of a relationship between a history and a taste, a taste history of another person, or information about a different taste preferred by a user having a certain taste; and
selecting and providing an item suited to the user tastes inferred by the second neural network, from among the different items that are not included in the user information within the user-preferred item candidates inferred by the first neural network, using information about relationships between tastes and items.

11. The method of claim 10, further comprising imparting a different weight to each category of item candidates, wherein the inferring of the user-preferred item candidates comprises inferring the user-preferred item candidates based on the weight for each category, and
the inferring of the user tastes comprises inferring the user tastes based on the weight for each category.

12. The method of claim 10, further comprising:
training the first neural network regarding a result of inferring the user-preferred item candidates, the result being fed back to the first neural network; and
training the second neural network regarding a result of inferring the user tastes, the result being fed back to the second neural network.

13. The method of claim 10, wherein the first neural network and the second neural network use a collaborative filtering model.

* * * * *